(12) United States Patent
Kamada et al.

(10) Patent No.: US 10,996,764 B1
(45) Date of Patent: May 4, 2021

(54) SYSTEMS AND METHODS FOR AUTOMATING COMPONENTS WITH GUARDED TOUCHSCREEN CONTROLS

(71) Applicant: Rockwell Collins, Inc., Cedar Rapids, IA (US)

(72) Inventors: Steven L. Kamada, Cedar Rapids, IA (US); Angela N. Dunlay, Marion, IA (US); Phillip J. Hamm, Cedar Rapids, IA (US); Jonathan R. Demildt, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/510,684

(22) Filed: Jul. 12, 2019

(51) Int. Cl.
*G06F 3/01* (2006.01)
*G06F 9/451* (2018.01)
*H04W 12/06* (2021.01)
*B64D 37/26* (2006.01)
*G06T 13/80* (2011.01)

(52) U.S. Cl.
CPC ............. *G06F 3/017* (2013.01); *B64D 37/26* (2013.01); *G06F 9/451* (2018.02); *G06T 13/80* (2013.01); *H04W 12/06* (2013.01)

(58) Field of Classification Search
CPC ......... G06F 3/017; G06F 9/451; B64D 37/26; H04W 12/06; G06T 13/80
USPC .......................................................... 715/738
See application file for complete search history.

(56) References Cited

U.S. PATENT DOCUMENTS

2012/0036445 A1* 2/2012 Ganille ............... G06F 11/0739
715/738

* cited by examiner

*Primary Examiner* — Andrey Belousov
(74) *Attorney, Agent, or Firm* — Suiter Swantz pc llo

(57) ABSTRACT

A system includes a display device and a control circuit. The control circuit generates an interface including a visual representation of a component of a platform, a status of the component indicated by a plurality of sensors associated with the platform, and one or more user interface elements corresponding to the component of the platform and one or more locations on the interface. The control circuit receives an indication of one or more gestures identifying at least one user interface element; selects an interaction guard from a plurality of interaction guards each corresponding to a respective authorization process identifying at least one authorization gesture; initiates, responsive to the selected interaction guard, the authorization process corresponding to the interaction guard; and causes, responsive to receiving the at least one authorization gesture, an operation of the component corresponding to the identified at least one user interface element.

20 Claims, 11 Drawing Sheets

SYSTEMS AND METHODS FOR AUTOMATING COMPONENTS WITH GUARDED TOUCHSCREEN CONTROLS

BACKGROUND

The inventive concepts disclosed herein relate generally to the field of avionics systems. More particularly, embodiments of the inventive concepts disclosed herein relate to systems and methods for automating components with guarded touchscreen controls.

User interfaces of an aircraft can have switches, levers, dials, buttons, and other types of physical interfaces included for performing various operations by the pilot. The physical interface can be used to maneuver or control various components or functions of the aircraft. To initiate a single operation, such as a fuel dump operation, the pilot can be required to manually setup various physical interface control to ensure the single operation can execute, which can be inefficient and increase likelihood of errors.

SUMMARY

In one aspect, the inventive concepts disclosed herein are directed to a system. The system includes a display device and a control circuit. The control circuit is configured to generate an interface including a visual representation of a component of a platform, a status of the component indicated by a plurality of sensors associated with the platform, and one or more user interface elements corresponding to the component of the platform and one or more locations on the interface; receive an indication of one or more gestures via the interface, the gesture identifying at least one user interface element; select, based on the gesture, an interaction guard from a plurality of interaction guards, each interaction guard corresponding to a respective authorization process identifying at least one authorization gesture; initiate, responsive to the selected interaction guard, the authorization process corresponding to the interaction guard; and cause, by an automation controller responsive to receiving the at least one authorization gesture, an operation of the component corresponding to the identified at least one user interface element.

In a further aspect, the inventive concepts disclosed herein are directed to an airborne platform. The airborne platform includes a plurality of sensors to detect one or more component statuses, a centralized automated controller configured to store one or more operation instructions to operate the component of the airborne platform, a communication interface configured to retrieve, via a network, the one or more operation from a centralized repository for the automation controller, a display device, and a control circuit. The control circuit is configured to generate an interface including a visual representation of a component of a platform, a status of the component indicated by a plurality of sensors associated with the platform, and one or more user interface elements corresponding to the component of the platform and one or more locations on the interface; receive an indication of one or more gestures via the interface, the gesture identifying at least one user interface element; select, based on the gesture, an interaction guard from a plurality of interaction guards, each interaction guard corresponding to a respective authorization process identifying at least one authorization gesture; initiate, responsive to the selected interaction guard, the authorization process corresponding to the interaction guard; and cause, by an automation controller responsive to receiving the at least one authorization gesture, an operation of the component corresponding to the identified at least one user interface element.

In a further aspect, the inventive concepts disclosed herein are directed to a method. The method includes generating, at a control circuit, an interface including a visual representation of a component of a platform, a status of the component indicated by a plurality of sensors associated with the platform, and one or more user interface elements corresponding to the component of the platform and one or more locations on the interface; receiving, at the interface, an indication of one or more gestures, the gesture identifying at least one user interface element; selecting, based on the gesture, an interaction guard from a plurality of interaction guards, each interaction guard corresponding to a respective authorization process identifying at least one authorization gesture; initiating, responsive to the selected interaction guard, the authorization process corresponding to the interaction guard; and causing, by an automation controller responsive to receiving the at least one authorization gesture, an operation of the component corresponding to the identified at least one user interface element.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
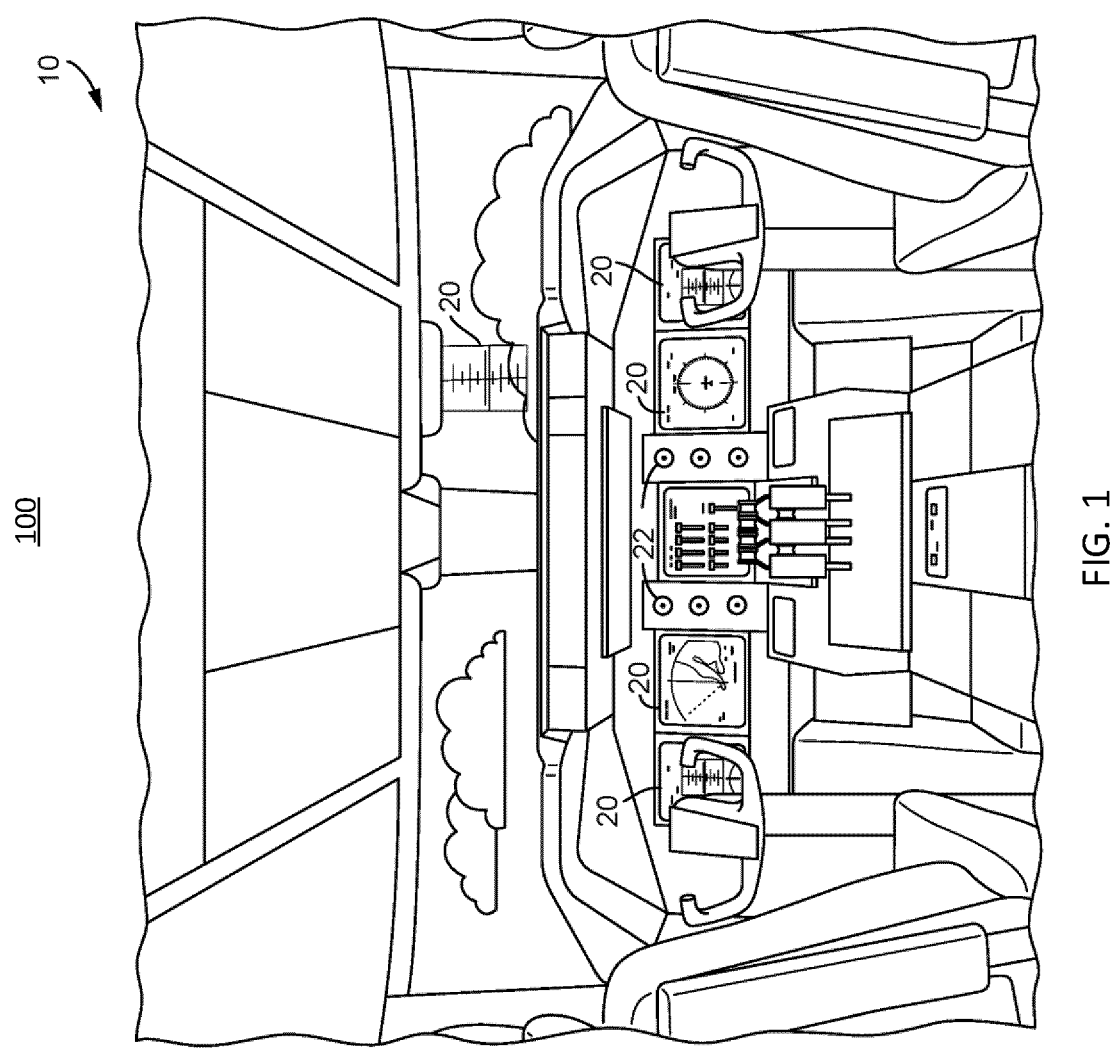
FIG. 1 is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for automating components with guarded touchscreen controls. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a display device and a control circuit. The control circuit is configured to generate an interface including a visual representation of a component of a platform, a status of the component indicated by a plurality of sensors associated with the platform, and one or more user interface ("UI") elements corresponding to the component of the platform and one or more locations on the interface, receive an indication of one or more gestures via the interface, the gesture identifying at least one UI element, select, based on the gesture, an interaction guard from a plurality of interaction guards, each interaction guard corresponding to a respective authorization process identifying at least one authorization gesture, initiate, responsive to the selected interaction guard, the authorization process corresponding to the interaction guard, and cause, by an automation controller responsive to receiving the at least one authorization gesture, an operation of the component corresponding to the identified at least one UI element.

The system can be integrated with an airborne platform or other platform as described herein. For example, the feedback and display devices described herein can be associated with an aircraft cockpit display of the airborne platform, with flight planning software for aircraft dispatch, and with air traffic control.

Systems manufactured in accordance with the inventive concepts disclosed herein can improve the operation of aircraft and other platforms by providing visual representation of various components and structures of the platform, various UI elements to initiate an operation, various interaction guards corresponding to the UI elements for preventing accidental interaction, as well as generating a report based on an executed operation. The visual representation can be color-coded to help users indicate a status or a process of the operation. For example, the status can identify at least a state of the operation, e.g. initiation, execution, or completion state, or the time to completion, e.g. 5 minutes, 30 minutes and 20 seconds, etc., whereas the process can help the user identify an operating component. The UI elements can correspond to an operation for configuring the various components of the platform. The UI elements can initiate the operation based on an indication of a gesture, wherein the operation can include a plurality of instructions for configuring the components. Initiating a plurality of instruction based on a single gesture can reduce time and increase efficiency for the user to configure the component of the platform. For example, the user can determine to operate a first component associated with a second component of the platform. The user can provide a gesture to a UI element to initiate a first operation corresponding to the first component. The associated second component can execute a second operation responsive to initiating the first operation corresponding to the first component. The operation can cycle through or sequentially select a component of the first set to operate and concurrently enable or disable a component of the second set corresponding to the component of the first set. The operation can be executed continuously, sequentially, or periodically based on the control circuit configuration. In some cases, the interaction guard can be selected based on the UI element to help avoid accidental, unintentional, or unauthorized interaction which might otherwise occur in some touch interface systems. The interaction guard can be multi-layered or multi-gestured based on the severity of the configuration to the operation of the platform. The generated report can provide a visual feedback of changes to the platform based on the operation, which can allow the user to further fine-tune or adjust the configuration prior to terminating the operation. The system can improve upon existing analog controls by automatically configuring a plurality of components via selecting a UI element (rather than configuring a plurality of analog controls to execute a single operation).

Each UI element can be configured with an interaction guard as security measures against accidental gestures or to provide a dialog to guide the user towards a desired operation based on receiving a gesture corresponding to the UI element. The generated interaction guard can be at least multi-location, multi-gesture, or time dependent. The multi-location interaction guard can initiate a dialog box which can provide an overview of the operation for confirmation. The multi-gesture interaction guard can require two or more authorization gestures, such as a swipe gesture and a tap gesture. The two or more gestures can be distinguished by an absent of gesture. The time-dependent interaction guard can be based on a timer. The authorization process can be satisfied based on a duration corresponding to the timer expiration. By implementing various such interaction guards, systems and methods in accordance with the inventive concepts disclosed herein can address inadvertent gestures that may result from operating touchscreen interfaces (which may lack the level of tactile feedback provided by physical interfaces).

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flights displays 20 may be configured to function as, for example, a primary flight display (PFD) used to display altitude, airspeed, vertical speed, and navigation and traffic collision avoidance system (TCAS) advisories. One or more of the flights displays 20 may also be configured to function as, for example, a multi-function display used to display navigation maps, weather radar, electronic charts, TCAS traffic, aircraft maintenance data and electronic checklists, manuals, and procedures. One or more of the flights displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flights displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three-dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may be incorporated by the flight displays 20 (e.g., the UI elements 22 may appear on or be part of the flight displays 20). The UI elements 22 may include, for example, dials, switches, buttons, touchscreens, keyboards, a mouse, joysticks, cursor control devices (CCDs), menus on Multi-Functional Displays (MFDs), or other multi-function keypads certified for use with avionics systems. The UI elements 22 may be a plurality of touchscreen elements for operating the platform, for example, each touchscreen element can include functions corresponding to dials, switches, buttons, or other physical interface to operate the platform. In some cases, all operational features of the platform can be performed by interaction with the touchscreen elements. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may be further configured interact with the platform status or parameters, wherein each UI element can correspond to an operation of the platform. For example, the UI elements 22 may be used to adjust the altitude or rate of increasing or decreasing the altitude of the platform. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2:
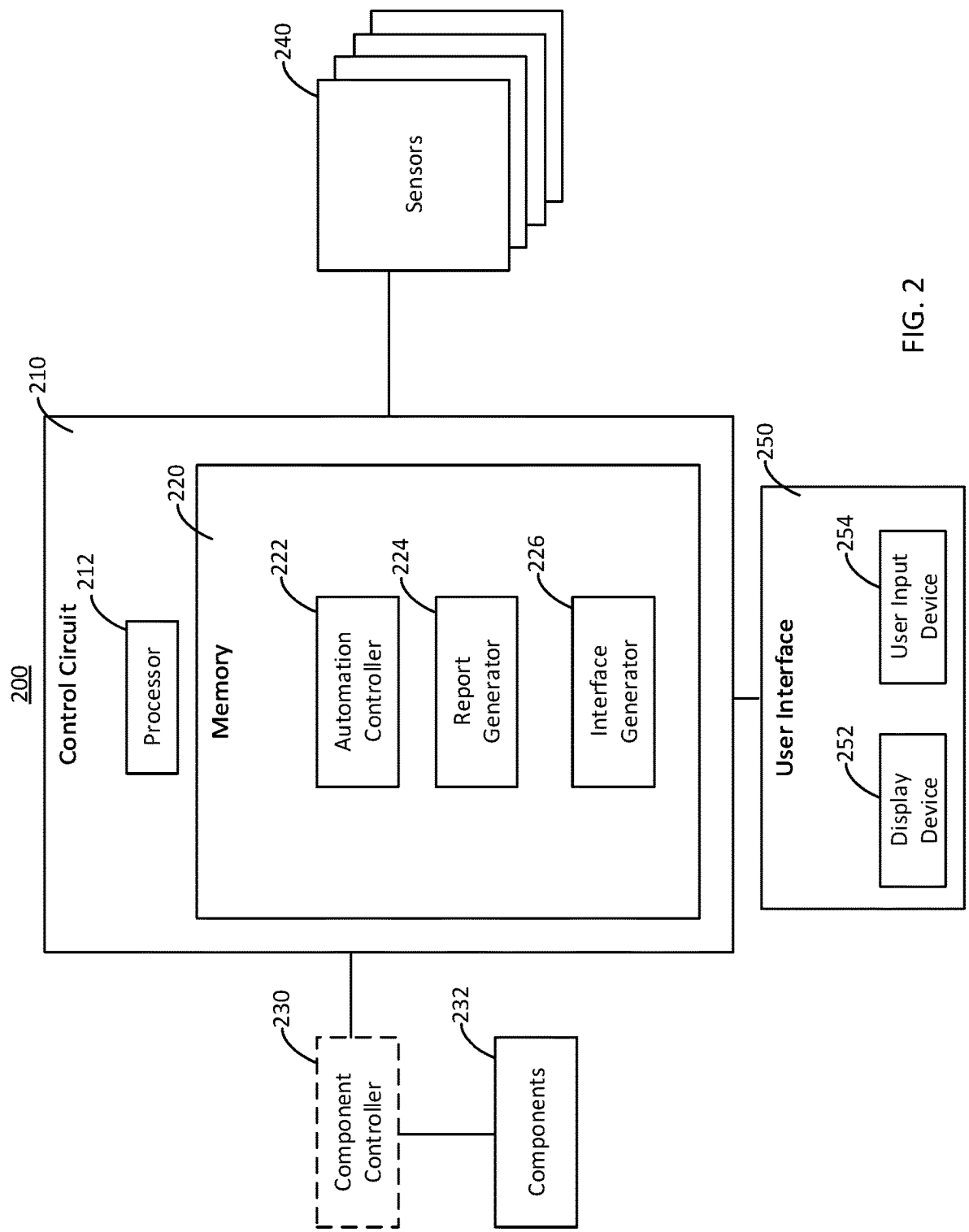
FIG. 2 is a block diagram of an exemplary embodiment of a system for automating components with guarded touchscreen controls according to the inventive concepts disclosed herein.

Referring now to FIG. 2, a schematic diagram of a system 200 is shown according to an exemplary embodiment of the inventive concepts disclosed herein. The system 200 can include a control circuit 210, a user interface 250, a plurality of sensors 240, a component controller 230, and a plurality of components 232.

The control circuit 210 (e.g., processing circuit, processing electronics) can include a processor 212 and memory 220. The processor 212 may be implemented as a specific purpose processor, an application specific integrated circuit (ASIC), one or more field programmable gate arrays (FPGAs), a group of processing components, or other suitable electronic processing components. The memory 220 can be one or more devices (e.g., RAM, ROM, flash memory, hard disk storage) for storing data and computer code for completing and facilitating the various user or client processes, layers, and modules described in the present disclosure. memory 220 automation controller 222 report generator 224 interface generator 226 The memory 220 may be or include volatile memory or non-volatile memory and may include database components, object code components, script components, or any other type of information structure for supporting the various activities and information structures of the inventive concepts disclosed herein. The memory 220 can be communicably connected to the processor 212 and includes computer code or instruction modules, an automation controller 222, a report generator 224, and an interface generator 226 for executing one or more processes described herein. The memory 220 includes various circuits, software engines, and/or modules that cause the processor 212 to execute the systems and methods described herein.

The user interface 250 can include a display device 252 and user input device 254. The display device 252 can be configured to display information, such as the components 232 of the platform. The display device 252 can be or include features of the flight displays 20 described with reference to FIG. 1. In some embodiments, the display device 252 is a HDD. The display device 252 can display flight plan information. The display device 252 can further display an interface including a visual representation of the component 232 of the platform, a status of the component 232, and one or more UI elements 22 for components 232 operation. The visual representation of the component 232 can include at least a circuitry of the component 232, location of the component 232 corresponding to the platform, and a structure of the platform. The status of the component 232 can include at least an altitude level, an operation setting such as on, off, open, or close, orientation, pressure level, or capacity (e.g., fuel capacity) of the component 232. The UI element 22 may include one or more graphically generated buttons or sliders indicating the location on the user interface 250 for an operation of the component 232. The generated button or slider can be configured by the interface generator 226 with various sizes, shapes, and colors. The UI element 22 may include one or more guide (e.g. text box, arrow indicator, etc.) to initiate the component 232 operation. The display device 252 can display terrain, structures, other platforms (e.g., other aircraft, ground-based platforms, water-based platforms), flight plans, navigation information, weather information, radar information, or other information associated with flight of an airborne platform.

The display device 252 can be configured by the control unit 210 to display a generated interaction guard from a plurality of interaction guards stored in the memory 220 based on a first gesture corresponding to a first location. The control circuit 210 can select the interaction guard from the plurality of interaction guards based on at least one of the first gesture or the first location. The first location can correspond to a UI element 22. The interaction guards can be generated by the interface generator 226. The interaction guards can be configured by the user or an administrator of the system 200 based on an operation corresponding to the UI element 22. In some cases, the operation can be marked with a security level based on the severity of the operation. The severity of the operation can indicate extent of configuring components 232 based on the operation or effect of the operation to the platform, for example, the fuel dump operation can be marked with a high security level due to the process effectively lowering the operational duration of the platform.

Figure 4A:
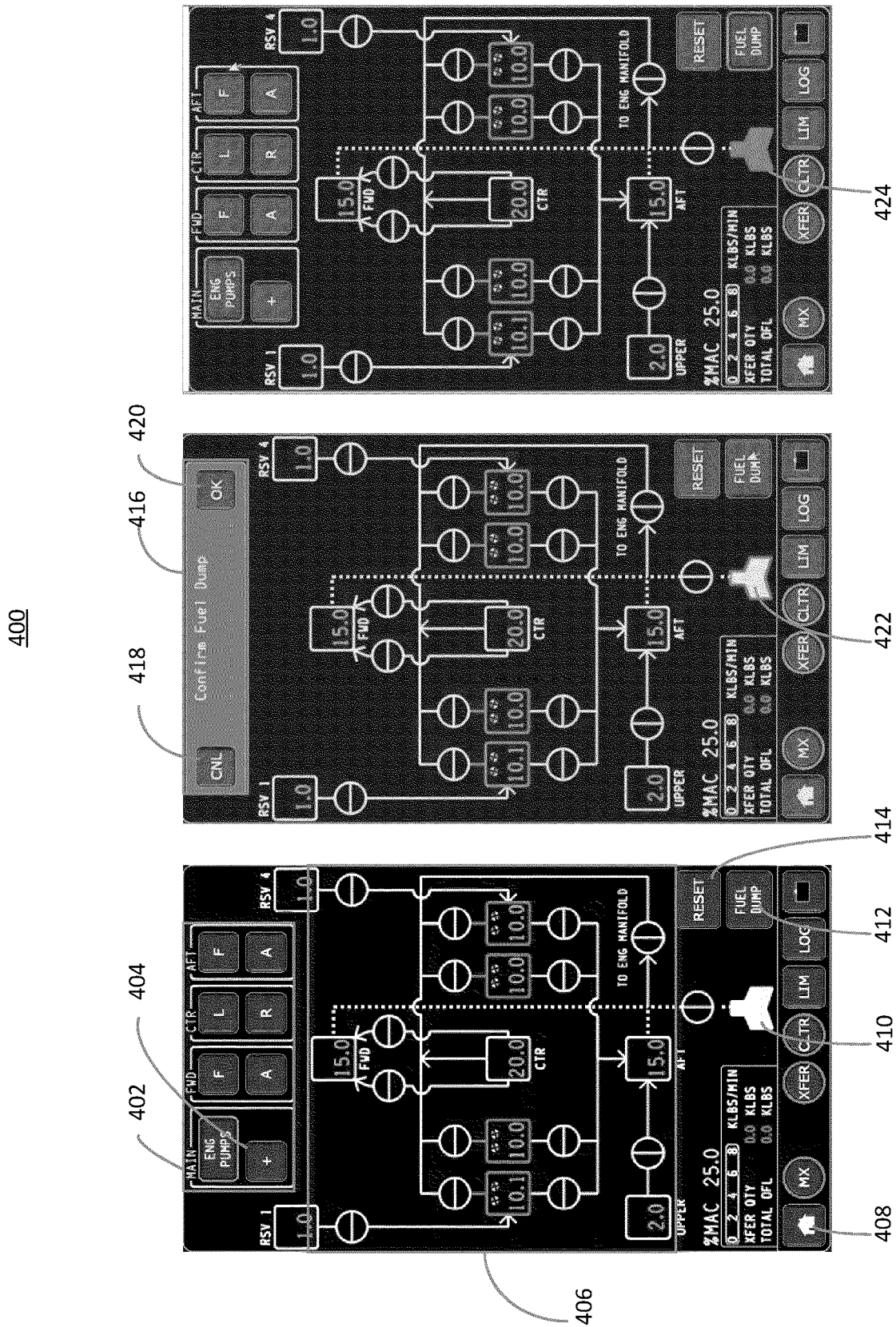
FIG. 4A is a schematic diagram of an exemplary embodiment of a user interface for demonstrating a multi-location interaction guard using a fuel dump operation according to the inventive concepts disclosed herein.
Figure 4B:
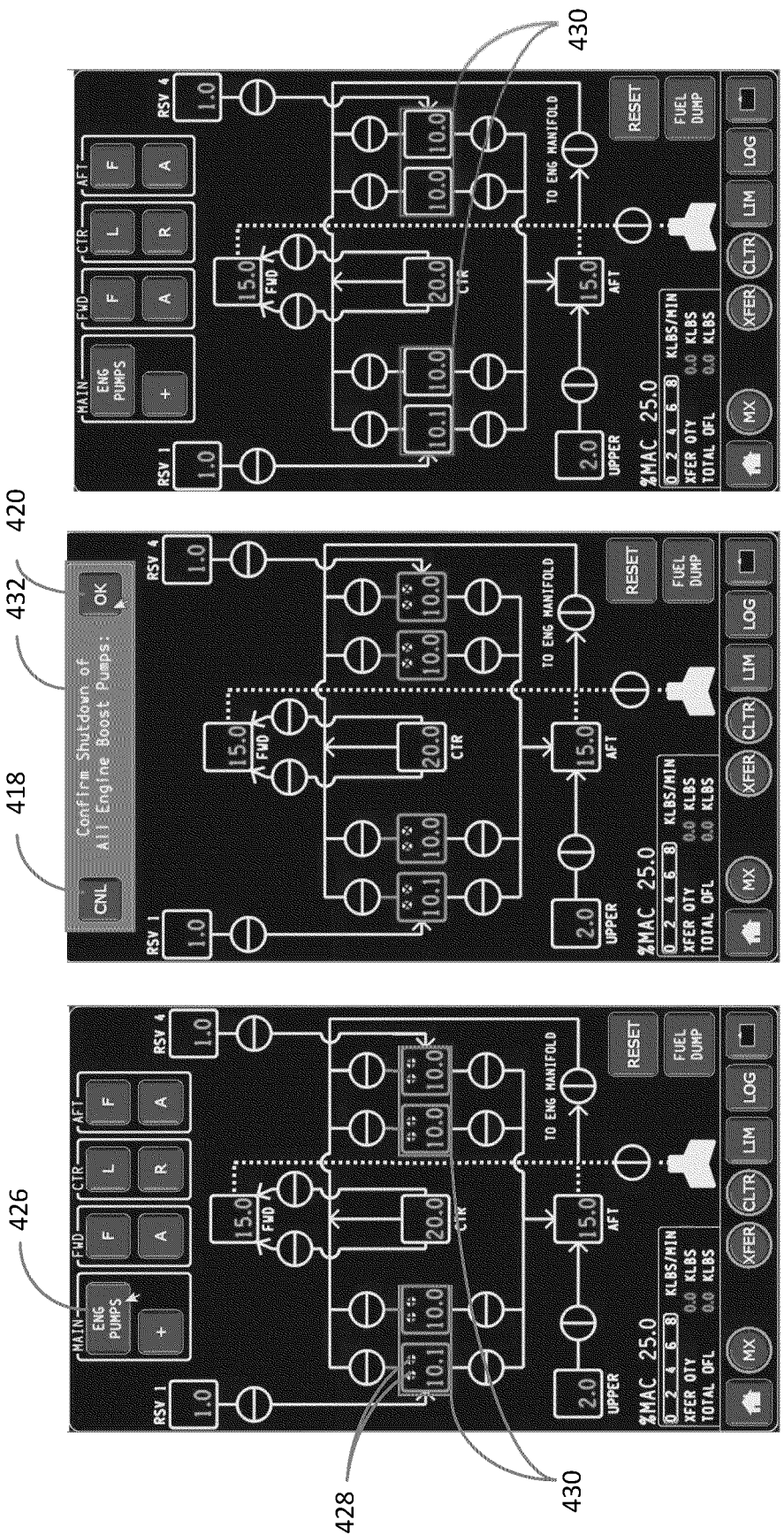
FIG. 4B is a schematic diagram of an exemplary embodiment of a user interface for demonstrating a multi-location interaction guard using an engine pump shutdown operation according to the inventive concepts disclosed herein.

Each interaction guard of the plurality of interaction guards can be at least one of various types corresponding to a respective authorization process stored by the control circuit 210. The control circuit 210 can configure the authorization process to require one or more authorization gestures to satisfy the interaction guard and initiate the operation corresponding to the UI element 22. The interaction guards type can include at least multi-location, multi-gesture, or time-dependent. The multi-location interaction guard can generate a confirmation element or a cancellation element in a second location different from the first location, which can be within a dialog box to provide an overview of the operation to confirm, as seen in FIGS. 4A-B. The multi-gesture interaction guard can require at least two similar or different authorization gestures. The authorization gestures can be distinguished by an absent of gesture. The time-dependent interaction guard can initiate a timer responsive to the user input device 254 receiving an indication of the authorization gesture. The authorization process can be satisfied by providing a continuous authorization gesture (e.g. holding gesture) for the duration of the timer or until a timeout. The authorization process can be reset based on an absent of the authorization gesture prior to the timeout. For example, the display device 252 can display at least one popup dialog box, initiated based on the interaction guard type, including one or more additional UI elements 22, such as virtual buttons or switches. The buttons or switches can reside in a second location different from a first location, which can include a confirmation element or a cancellation element. The user can provide an authorization gesture to the confirmation element to initiate the operation or to the cancellation element to terminate the authorization process of the interaction guard.

Figure 5A:
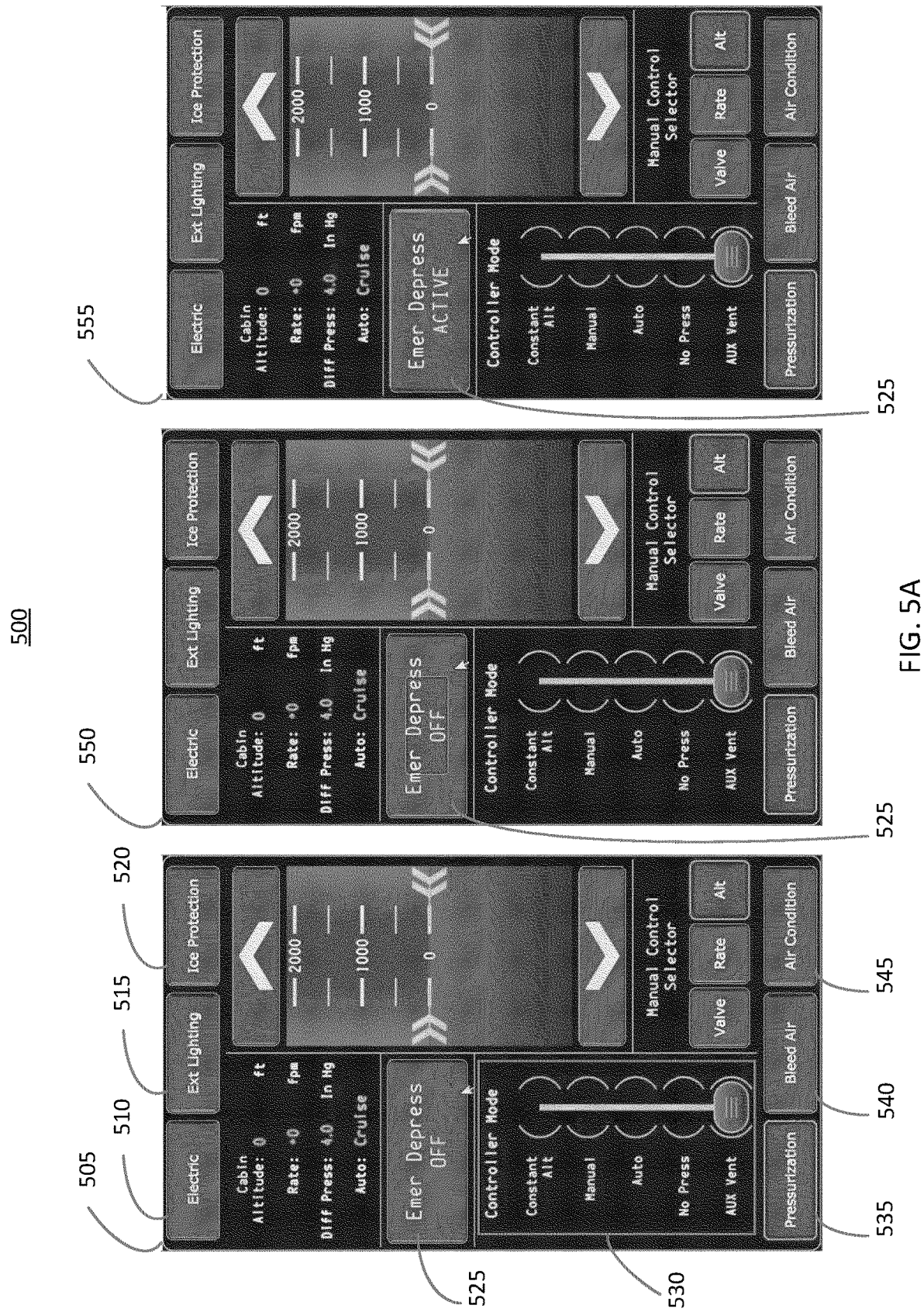
FIG. 5A is a schematic diagram of an exemplary embodiment of a user interface for demonstrating a time-dependent interaction guard according to the inventive concepts disclosed herein.

In some cases, the display device 252 can display at least one animation responsive to receiving an indication of a gesture. The gesture can include at least a tap, a hold, a swipe, a slide, a drag, a pinch, or a spread. The animation can include at least blooming effect, breathing effect, sliding effect, flashing effect, or color cycle effect. The animation can be correspond to the authorization process, and the control circuit 210 can select the animation for display by the display device 252 responsive to the authorization process that the control circuit 210 determines to use (e.g., determines to use based on the first gesture or the first location). For example, the authorization process can require the user to initiate a hold and drag authorization gesture. The display device 252 can provide, responsive to receiving the hold gesture, the sliding effect indicating the direction to drag the gesture. In another example, the authorization process can be time-dependent, which can generate a blooming effect on the UI element 22 indicating a duration of hold gesture required, as seen in FIG. 5A.

In some cases, the control circuit 210 can cause the interaction guard to initiate a second interaction guard based on the authorization process. The second interaction guard can include a generated button located in a third location which can be different from the first location. The second interaction guard can require a second gesture, different from the first gesture. For example, the user input device 254 can receive at least one input from the user indicating an interaction with the first button, e.g. a click, to initiate an authorization process having a first interaction guard requiring the user to hold the button for 1 second as a first authorization gesture. The first interaction guard can then generate a second interaction guard requiring a drag gesture as the second authorization gesture based on completing the first authorization gesture. The control circuit 210 can execute the operation of the component 232 based on completing the second authorization gesture to satisfy the authorization process.

The user input device 254 can be configured by the control circuit 210 to receive an indication of one or more gestures identifying at least one UI element 22. The user input device 254 can be or include a keyboard, a mouse, a pointing device, a video input device, an audio input device, or a haptic input device. The user input device 254 can determine the gesture pattern such as swipe, drag, pinch, or spreading, and the gesture speed indicated by a movement speed of the input device. The user input device 254 can determine present or absent of the gesture. The user input device 254 can be further configured to decline the gesture based on at least the gesture pattern received, the gesture speed, or an initiation of an authorization process.

The system 200 can include a plurality of sensors 240 including at least a pressure sensor, fuel level sensor, temperature sensor, force sensor, torque sensor, speed sensor, position and displacement sensor, level sensor, proximity sensor, flow sensor, acceleration sensor, orientation and angular velocity sensor, radar sensor, altimeter sensor, smoke detection sensor, and global positioning system ("GPS") sensor. The sensors 240 can be incorporated in the components 232 to provide one or more information of the component 232. The sensors 240 information can be accessed by the control circuit 210 for components 232 configuration.

The sensors 240 output information that can be received and processed by the control circuit 210 and provided to the user via the user interface 250. The pressure sensor can determine a pressure force applied to the component 232, which can indicate a structural integrity of the component 232. The speed sensor can determine the speed of the airborne platform. The radar sensor can identify one or more objects within a parameter of the airborne platform, which can be used to avoid turbulence. The altimeter sensor can determine the altitude of the airborne platform, which can be used by the automation controller 222 to adjust the altitude of the airborne platform. For example, the adjustment of the speed, altitude, or orientation of the platform can be determined by the user based on the information from the speed sensor, the altimeter sensor, and the radar sensor provided on the display device 252.

Figure 5B:
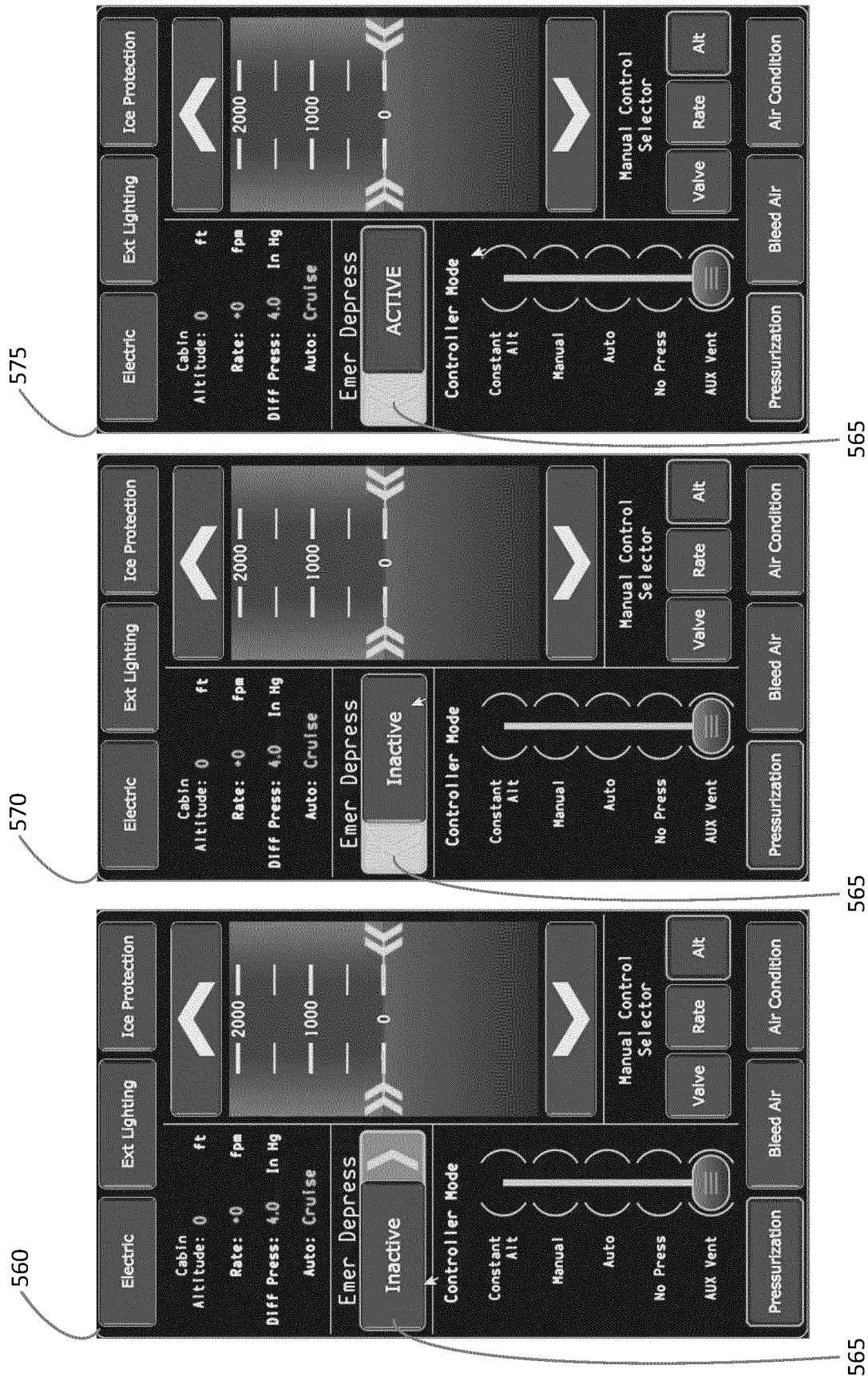
FIG. 5B is a schematic diagram of an exemplary embodiment of a user interface for demonstrating a multi-gesture interaction guard according to the inventive concepts disclosed herein.
Figure 6:
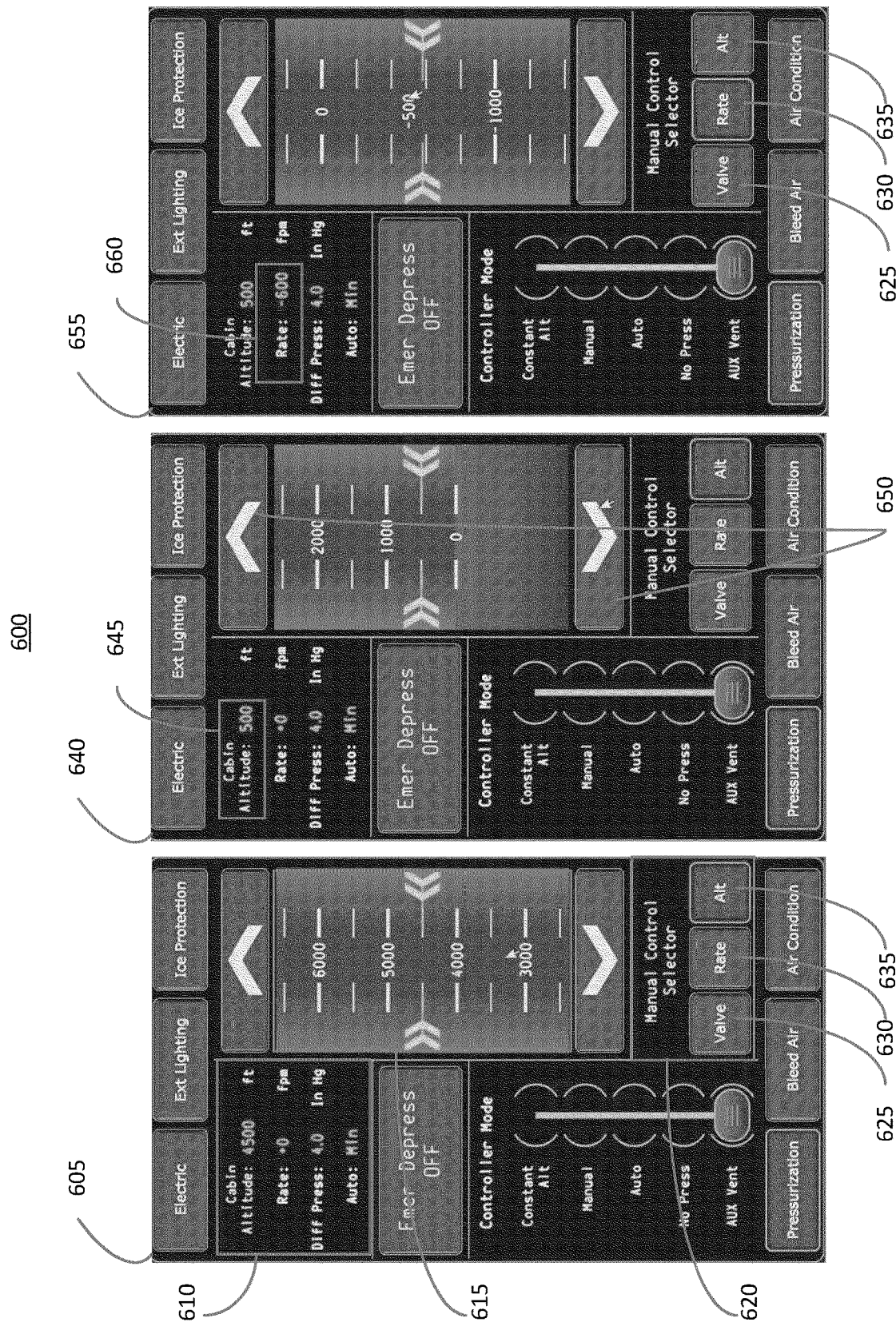
FIG. 6 is a schematic diagram of an exemplary embodiment of a user interface for demonstrating a combined input method according to the inventive concepts disclosed herein.

The system 200 can include a plurality of components 232 including at least a pair of wings, winglets, slats, spoiler, flaps, aileron, elevator, rudder, vertical stabilizer, horizontal stabilizer, engine, pumps, and fuel tank. The components 232 can be made of various types of materials, such as aluminum, steel, titanium, wood, or composite materials. The components 232 can be configured or controlled by the component controller 230 to adjust a status of the airborne platform. The status can include speed, altitude, orientation, direction, and stability of the airborne platform. In some embodiments, the component controller 230 can be absent from the system 200, such that the components 232 can communicate directly to the control circuit 210 for component 232 operation using the automation controller 222. The components 232 can be represented as one or more UI element 22. For example, an air conditioner (A/C) component can be represented as an A/C element, as seen in FIGS. 5A-B and FIG. 6. The user interface 250 can configure, based on an indication of a gesture to the A/C element, to display a one or more configuration UI elements 22 corresponding to the A/C component. The configuration UI elements 22, such as a scroll element or a fine-tune element, can be used to configure the settings of the A/C on the platform.

The system 200 can include a component controller 230, which can be in communication with the components 232. The component controller 230 can select one or more components 232 based on the user selecting a UI element 22. The component controller 230 can configure the components 232 to perform one or more operations based on an initiated authorization gesture. The operations can be based on the instruction from the automation controller 222 of the control circuit 210, which can include adjusting speed, altitude, orientation, direction, and stability of the airborne platform. The component controller 230 can execute one or more repetitive task based on using a gesture with the corresponding UI element 22, for example, a fuel dump operation can be initiated by the user via providing a gesture to the fuel dump UI element 22 and complete the authorization process, enabling the component controller 230 to open one or more valves to allow flow of fuel and terminate the operation based on the depleted fuel tank. The component controller 230 can determine to restore default components 232 configuration based on a verification result or user input.

The memory 220 can include an automation controller 222, a report generator 224, and an interface generator 226. The automation controller 222 can configure the component controller 230 to perform one or more operations on the components 232 based on the automation process stored in memory 220. The automation process can include one or more instructions to operate the components 232. In some embodiments, the automation controller 222 can provide one or more instructions of the automation process directly to the components 232 without the component controller 230. The automation controller 222 can be enabled or disabled based on an indication of automatic mode or manual mode configured by the user on the user interface 250. The automation controller 222 instruction can be configured responsive to the received one or more gestures. The automation controller 222 can cancel the automation process based on the gesture received by the user interface 250. The automation controller 222 can store default and custom automation process, for example, the memory 220 can include default operation instruction, which can be used to perform routine operation, however, given certain non-routine operation, a custom operation instruction can be configured by the user for the automation controller 222 execution, such as altitude, speed, or navigation adjustment for the airborne platform under certain situation.

The report generator 224 can be configured to verify the automation controller 222 execution using one or more verification process stored in memory 220. The verification process can include one or more instructions to verify the status of the components 232 based on the execution of the automation controller 222. The report generator 224 can be further configured to generate a verification report based on executing the automation process, which can be stored in the memory 220. For example, during execution of a fuel dump operation, the automation controller 222 can provide the component controller 230 with one or more instructions to operate the components 232, and based on a comparison of the components 232 status and the automation controller 222 instruction, the control circuit 210 can use the report generator 224 instruction to provide an acknowledgement for generating a verification report. The verification report can be provided via the user interface 250, which can be displayed via the display device 252. The verification report can be used by the user for further configuration via user input device 254, for example, based on the resulting configuration of the components 232 by the automation controller 222, the user can fine tune the configuration by providing gesture to one or more UI elements 22, the UI element 22 generated with the verification report.

The interface generator 226 can access a plurality of UI elements 22 and animations stored in the memory 220, the UI elements 22 and animations can be configured via the user interface 250. The interface generator 226 can update or provide the UI element 22 for the user interface 250 to display via the display device 252. The interface generator 226 can include a plurality of interaction guards corresponding to each UI element 22. The UI element 22 can incorporate one or more animation based on the interaction guard, or the status of the components 232. The interface generator 226 can store a structure of the airborne platform, with indication of the components 232, including at least a status of the valves, a fuel level, a pressure level, or an altitude level. The interface generator 226 can provide a color-coded UI element 22 based on the status of the component 232. For example, the interface generator 226 can generate an interface indicating a structure of the platform, the interface can include a plurality of valves in a closed state. The interface generator 226 can configure the valve with a first color-code to display via the display device 252 based on the closed state of the valve. The interface generator 226 can initiate, responsive to the component controller 230 opening the valve, a rotating animation corresponding the opening of the valve. The interface generator 226 can generate a second color-code responsive to an indication of the valve under at least one operation of the automation controller 222.

The control circuit 210 can generate the user interface 250 and provide a visual representation of the user interface 250 to the display device 252. For example, the control circuit 210 can generate a user interface 250 to present the visual representation of features, such as the component 232 of the platform, the status of the component 232 indicated by the plurality of sensors 240 associated with the platform, and the one or more UI elements 22 corresponding to the component 232 of the platform and one or more locations on the interface using the interface generator 226. The control circuit 210 can continuously (or regularly) receive the indication of one or more gestures via the user input device 254 of the user interface 250 identifying at least one UI element 22. The control circuit 210 can detect one or more parameters of the gesture, for example a pattern or a speed of the gesture based on various locations, directions, or motions indicated by the received gesture on the user input device 254. The user element can include at least the graphically generated buttons or sliders.

The control circuit 210 can select an interaction guard from the plurality of interaction guards based on an indication of a gesture received by the user input device 254. The control circuit 210 can determine the indication of the gesture based a change in the user input device 254 sensor, such as a change in resistance, capacitance, infrared, or surface acoustic wave. In some cases, the user interface 250 can concurrently receive more than one gesture. The gesture can correspond to at least one UI element 22 based on the location of the gesture on the user interface 250. For example, the control circuit 210 can configure the display device 252 to display a visual representation of a plurality of UI elements 22. Each UI element 22 can correspond to a location on the user interface 250. The control circuit 210 can determine the UI element 22 selected by locational comparison between the generated UI element 22 location and the gesture location. The gesture can include swipe, drag, pinch, or spreading which can be similar to the gesture used to select the interaction guard.

The control circuit 210 can initiate, based on the selected interaction guard, an authorization process. The interaction guard from the plurality of interaction guards can correspond to a respective authorization process, which can require at least one authorization gesture to initiate an operation. The authorization gesture can refer to at least one gesture to satisfy the authorization process. The control circuit 210 can configure the user interface 250 to display a visual representation of the authorization process using the display device 252 and receive the authorization gesture using the user input device 254. The control circuit 210 can cause an operation of the component corresponding to the identified at least one user element by the automation controller 222 based on receiving the authorization gesture. The interaction guard can be associated with a security level corresponding to severity of the operation. For example, gesture to execute fuel dump operation during operation of the airborne platform can initiate multi-layered authorization process, which can require at least two authorization gesture (high severity), wherein gesture to execute the fuel dump operation during non-operation of the airborne platform can initiate single-layered authorization process which can require one authorization gesture (low severity). The interaction guard can be configured to block gesture in one or more locations of the user interface 250, which can be based on the operation of the airborne platform.

Figure 8A:
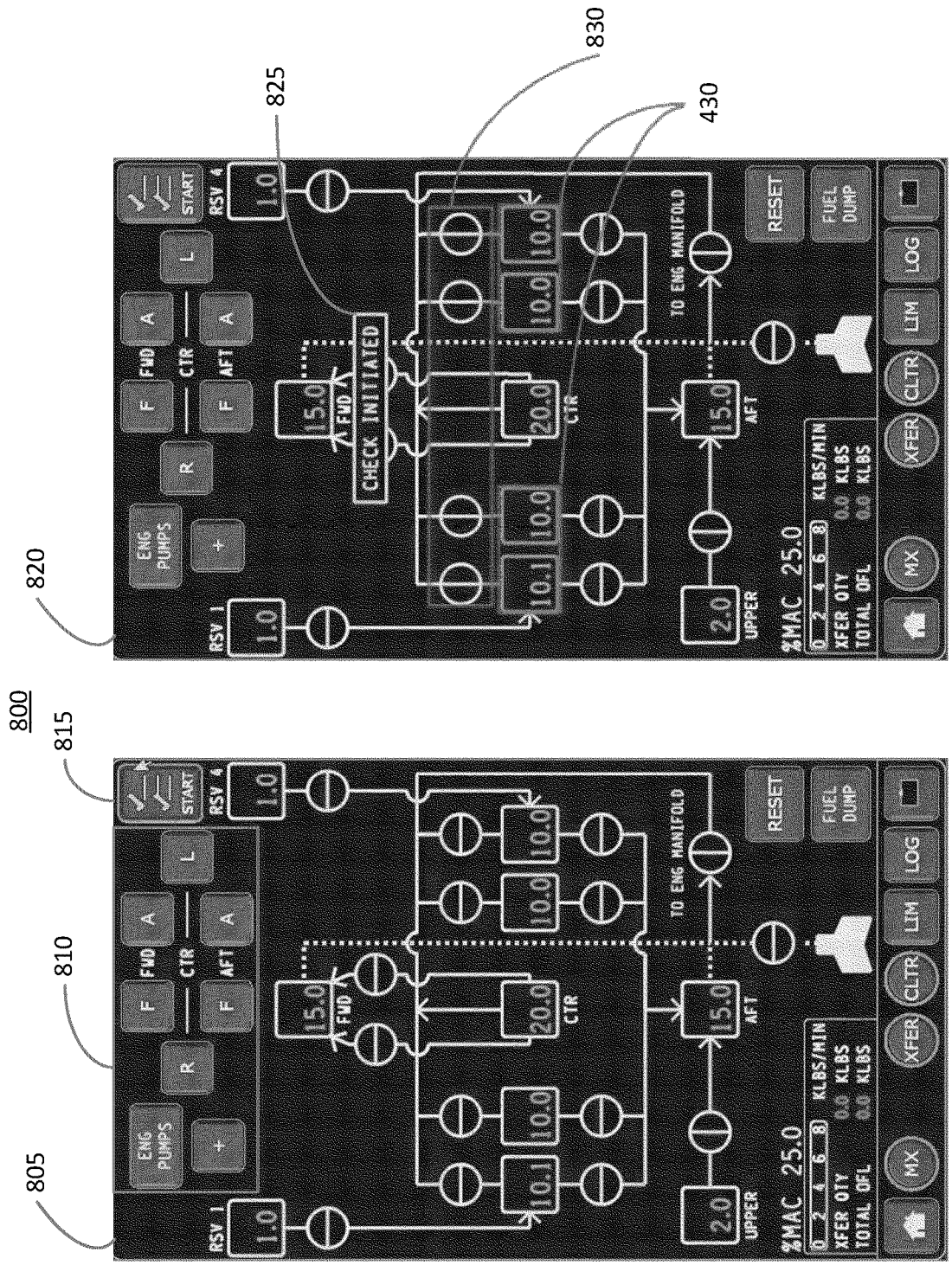
FIG. 8A is a schematic diagram of an exemplary embodiment of a user interface for demonstrating an initiation of a fuel pressure check operation according to the inventive concepts disclosed herein.
Figure 8B:
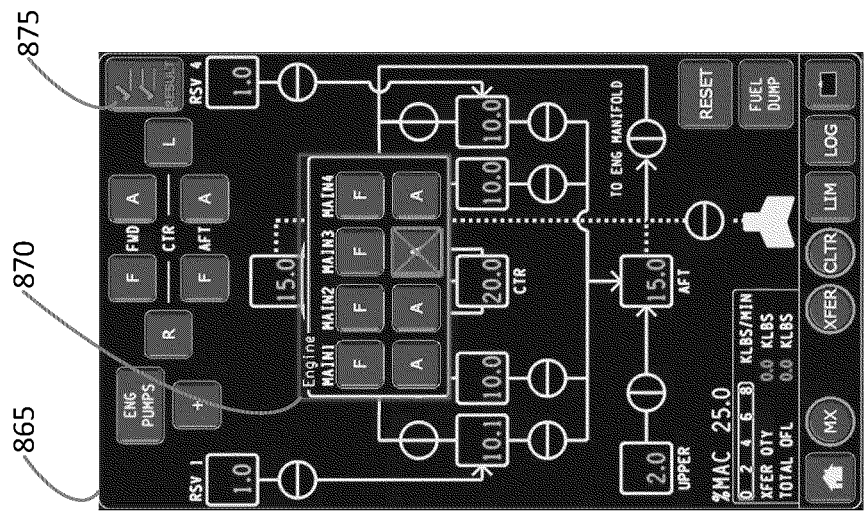
FIG. 8B is a schematic diagram of an exemplary embodiment of a user interface for demonstrating an execution or completion of a fuel pressure check operation according to the inventive concepts disclosed herein.
Figure 8B:
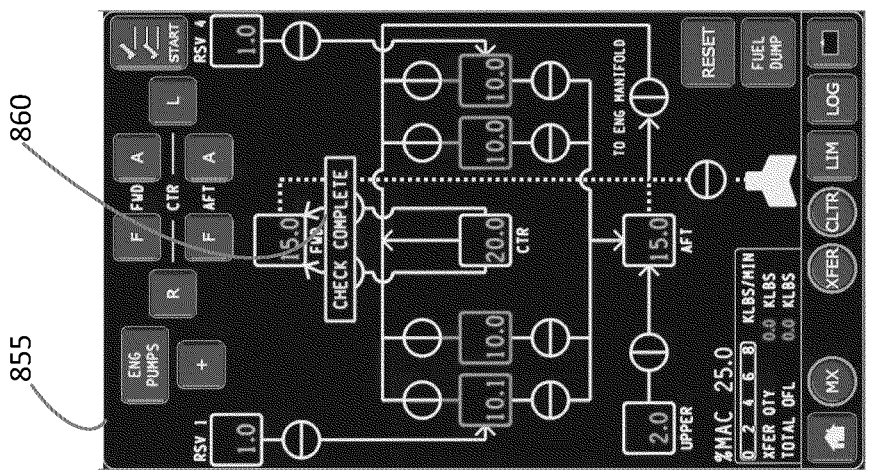
Figure 8B:
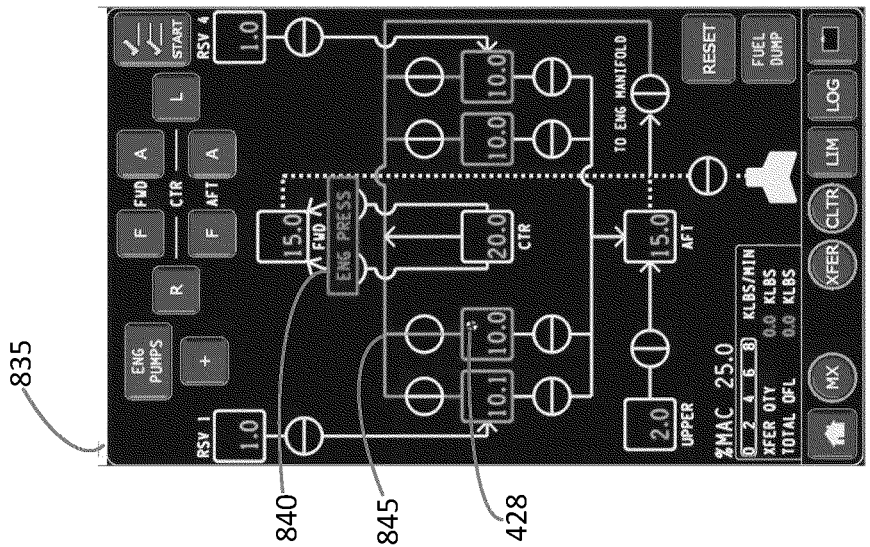

The control circuit 210 can verify, responsive to an interaction with a verification element, the executed operation of the component 232 based on a verification process stored in the memory 220. The verification process can include various operations or commands provided by the control circuit 210 to verify a status or condition of at least the components 232 of the platform. The operations or command of the verification process can include at least enabling or disabling components 232, receiving information from the plurality of sensors 240 corresponding to the components 232, or detecting an expected operation of the component 232. The verification process can configure the automation controller 222 to execute the component controller 230 operation. The verification can provide an indication of at least the status of the component 232 and an execution status of the automation process. The status of the component 232 can include at least the component 232 state (e.g. opened, closed, on, or off) and performance (e.g. max speed, max pressure resistant, and operational temperature). The execution status can correspond to a success or failure of the executed automation process. For example, the control circuit 210 can initiate an engine pump verification process to verify various engine pumps, as seen in FIGS. 8A-B. The verification process can initiate by opening various valves corresponding to the engine pumps, which the sensors 240 can receive an information indicating the valve status. Each of the engine pump can be enabled and disabled in sequence or in parallel, wherein the sensors 240 can further receive an information corresponding to the engine pump. The information can include a status or an operation (e.g. rotate, push, pull, stop, etc.) of the components 232, which can be used to determine a condition of the component 232.

The control circuit 210 can generate a verification report indicating one or more operations of the components 232 to execute the verification process using the report generator 224 based on verifying the component 232 operation. The control circuit 210 can store the generated verification report in the memory 220. The control circuit 210 can display the verification report in at least a pop-up dialog box indicating a result of the verification process using the display device 252. For example, the control circuit 210 can display at least one status of the component 232 responsive to determining the condition of the component 232, as seen in FIG. 8B. The condition of the component 232 can be the status or the operation, such as on, off, rotate, push, pull, or other functions conventional to the corresponding component 232 under verification. The component 232 exhibiting at least one operation uncorrelated to provided verification command can be marked and display with the verification report. The mark can include at least a cross, a dash, or a color highlight. In some cases, the verified component 232 can be marked as operational instead of either an unverified component 232 or a non-operational component 232.

The control circuit 210 can be configured to output a plurality of alerts corresponding to initialization of one or more processes of the control circuit 210, such as an authorization process or a verification process. The alerts can be outputted to provide at least an indication of detected operation status (e.g. initiate, execute, complete, etc.), a confirmation or cancellation request, or an indication to initiate an additional command based on an initiated operation. The process can include at least the interaction guard initialization, the authorization process, the automation process, the verification process, and the report generation process. The alert can include at least audio alert, text alert, or image alert. The audio alert can include system audio feedback, radio transmission, or a plurality of notification noises which can be repeatable. The text alert can display readable messages which can indicate the status of the control circuit 210. The image alert can include swapping display of the one or more components 232, a plurality of animation corresponding to the components 232 status, surrounding terrain corresponding to the position of the airborne platform, or an indication of a navigation path. For example, the control circuit 210 can output a first alert responsive to initiating the authorization process corresponding to the interaction guard and output a second alert responsive to causing the operation of the component 232. The first alert can include the image alert navigating the authentication process, and the second alert can include a text alert corresponding to the automation process to execute the operation of the components 232.

The control circuit 210 can display the status of the platform using the display device 252. The status of the platform can be received by the control circuit 210 using the plurality of sensors 240 corresponding to the components 232. The status of the platform can include of at least the valve status, the fuel level, the altitude, speed, and orientation of the airborne platform, and the animation corresponding to the components 232. The sensors 240 indicating the status of the platform can cause one or more alerts. For example, the control circuit 210 can be configured to cause the display device 252 to display the visual representation of the status of the platform, responsive to the plurality of sensors 240 transmitting one or more information to the interface generator 226, the information corresponding to one or more inputs received by the sensor 240.

In some cases, the control circuit 210 can be configured to determine the absence of gesture to terminate, cancel, or reset an operation, as a precaution for an absence of an operator. The control circuit 210 can output at least one alert responsive to requiring a gesture to continue or initiate an operation. The absent of gesture can indicate a gesture release, an interval between a first gesture and a second gesture, and a duration of the gesture determined by the interval between a first gesture absent and a second gesture absent. The gesture release can be determined by a duration of gesture absent after initiating the gesture, the duration of the gesture absent indicating the gesture release can be configured using the user interface 250. The gesture release can be used to select the UI element 22 corresponding to the location of the gesture release. The interval between the first gesture and the second gesture can provide an indication of a double click. The duration of the gesture can provide an indication of a false gesture, which can prevent the control circuit 210 from receiving the false gesture. For example, the control circuit 210 can determine, responsive to receiving the indication of the gesture, a release of the gesture based on the absent of the gesture corresponding to a released location, and determine, based on the released location of the gesture, the UI element 22 configuration corresponding the operation of the component 232.

The released gesture can indicate one or more instructions including at least a reset of the authorization process, initiation of a second interaction guard, the initiation of the authorization process, and initiation of the operation of the components 232. The reset of the interaction process can include a second initialization of the interaction process of the interaction guard, or cancellation of the interaction guard including the interaction process. The initiation of the authorization process can correspond to a security level of the interaction guard, which can be determined by the automation controller 222. The security level can be preset or configured by the user using the user interface 250. The security level can indicate one or more severity level of the operation, which can be based on an effect to the system 200 operation corresponding to the execution of the automation process, for example, execution of a fuel dump during airborne platform flight can require high security level interaction guard, whereas adjusting the altitude can be low security level which may not require an interaction guard. The components 232 operation can be executed by the component controller 230 based on the selected UI element 22. The released gesture can initiate a countdown which can be preconfigured or determined by the control circuit 210 using the automation controller 222, the countdown can initiate one or more operations including at least a gesture blocking mechanism, a lock screen requiring unlocking gesture, configure the interface generator 226 to display default user interface 250, or cancellation of components 232 operation.

Figure 3:
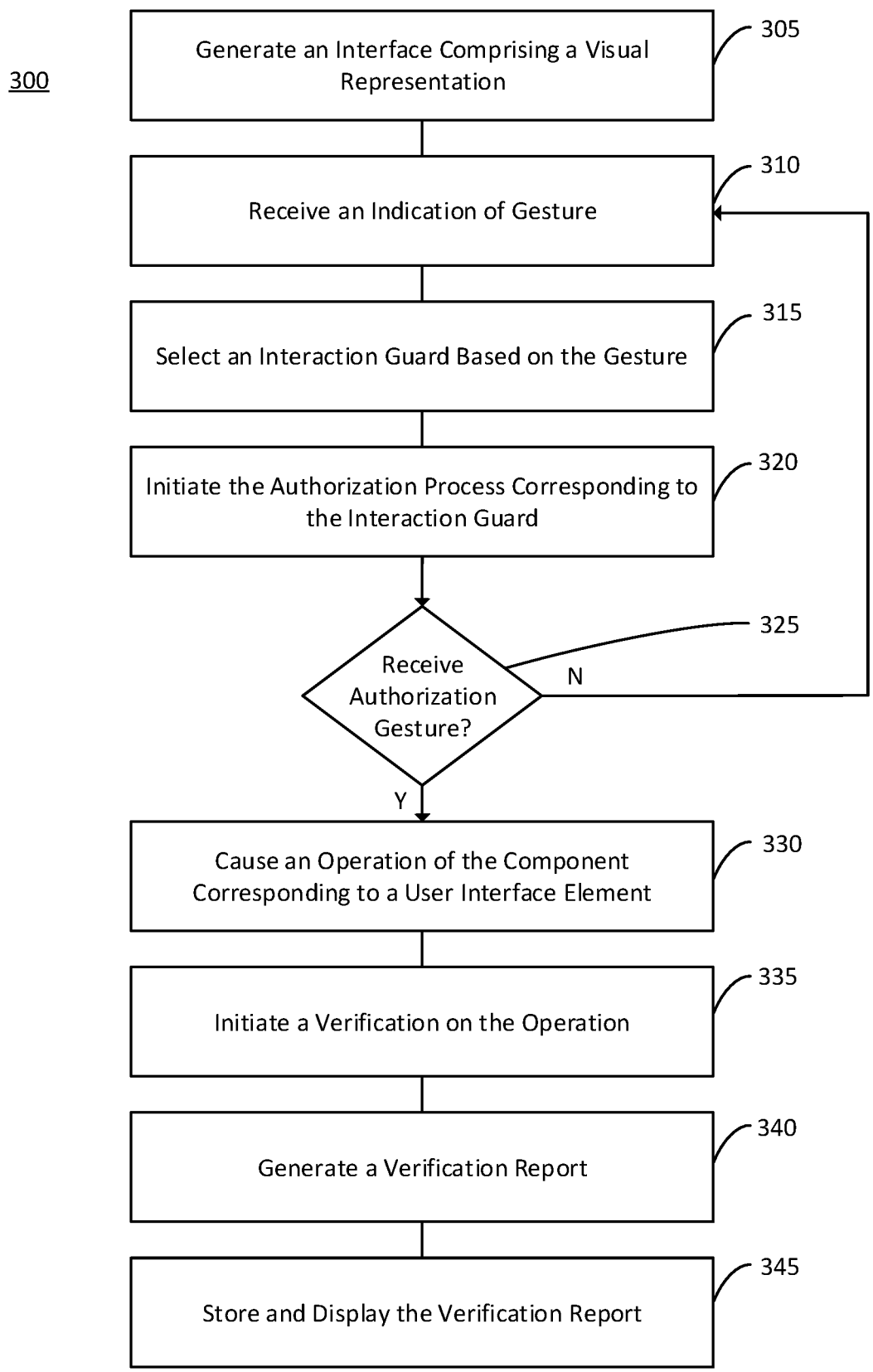
FIG. 3 is a flow diagram of an exemplary embodiment of a method according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the aircraft control center 10, the system 200, and/or components 232 thereof.

A step (305) may include generating, at a control circuit 210, a user interface 250 including a visual representation of a component 232 of a platform, a status of the component 232 indicated by a plurality of sensors 240 associated with the platform, and one or more user interface ("UI") elements 22 corresponding to the component 232 of the platform and one or more locations on the interface. The user interface 250 can display the visual representation generated by the interface generator 226 via the display device 252. The visual representation of the component 232 of the platform can be preconfigured based on a design or a structure of the platform. The component 232 of the platform can include at least a pair of wings, winglets, slats, spoiler, flaps, aileron, elevator, rudder, vertical stabilizer, horizontal stabilizer, engine, pumps, and fuel tank. The status of the component 232 associated with the platform can be displayed by the display device 252 responsive to the plurality of sensors 240 transmitting one or more information to the interface generator 226, the information corresponding to one or more information received by the sensors 240. The UI elements 22 can include a plurality of generated virtual buttons corresponding to at least one operation, for example, the interface generator 226 can generate a start element, which can be referred to in FIGS. 8A-B. The user interface 250 can receive an indication of a gesture corresponding to the start element to initiate at least the fuel pressure check operation including at least enabling or disabling a plurality of pumps within the platform, opening or closing a plurality of valves, or providing an overview of the fuel pressure check operation result.

A step (310) may include receiving, by the user input device 254, an indication of one or more gestures via the user interface 250, the gesture identifying at least one UI element 22. The indication of gesture can be provided by the at least a mouse, a keyboard, a haptic feedback, or a stylus. The gesture can include a plurality of motions provided to the user input device 254 of the user interface 250 in a plurality of locations. The motions of the gesture can include at least a tap, a hold, a swipe, a slide, a drag, or a plurality of combinations of the motions. The locations of the provided motion can correspond to the UI element 22 to initiate at least one operation or configuration responsive to the location of a gesture release. The gesture can be initiated based on an indication of at least one motion and completed based on an absent of an indication of the at least one motion. For example, the control circuit 210 can be configured to determine a release of the gesture based on the absent of the gesture corresponding to a released location responsive to receiving the indication of the gesture. The control circuit 210 can be further configured to determine, based on the released location of the gesture, the UI element 22 configuration corresponding to the operation of the component. In some cases, the gesture can be a multi-location gesture, for example, the control circuit 210 can require two fingers gesture, such as spreading motion to zoom in, pinching motion to zoom out, two fingers swipe for scrolling or two fingers tap for a secondary click (e.g. right click).

A step (315) may include selecting, based on the gesture, an interaction guard from a plurality of interaction guards, each interaction guard corresponding to a respective authorization process identifying at least one authorization gesture. The interaction guard selection can be based on a security level corresponding to the operation of the UI element 22. The security level can be based on a severity of the operation, such as a configuration to at least one parameter to the platform (e.g. increase/decrease speed, altitude, or orientation of the platform), an effect to at least one component 232 (e.g. enable/disable the component 232), or a configuration to at least one other operation of the platform (e.g. terminate/initiating a verification process or other operation). For example, the control circuit 210 can select a multi-location interaction guard based on the user providing a gesture to the fuel dump element, as referred to in FIG. 4A. The control circuit 210 can determine not to provide an interaction guard based on a gesture to adjust the platform parameters, such as increasing the altitude of the platform, as seen in FIG. 6. In some cases, the control circuit 210 can initiate an animation corresponding to the authorization process based on the selected interaction guard, the initiation of the animation can cause, by the control circuit 210, a visual representation of the animation to be displayed via the display device 252.

A step (320) may include initiating, responsive to the selected interaction guard, the authorization process corresponding to the interaction guard. The control circuit 210 can be configured to output a first alert responsive to initiating the authorization process corresponding to the interaction guard. The first alert can indicate the authorization gesture to provide for completing the authorization process, which can be indicated by an animation or a generated message. The animation can indicate, for example, the type of gesture to provide or the location to provide the gesture. The generated message can indicate, for example, an instruction to complete the authorization process, such as to press the one or more UI elements 22. The authorization gesture can be similar to the gesture to initiate the interaction guard selection, which can include at least similar motion or similar location. For example, the user can tap on a UI element 22 to select the interaction guard. The interaction guard corresponding to an authorization process can generate a slide and a slide element, which can be seen in FIG. 5B. The slide can include at least one moving vector to indicate the direction to slide the slide element. The user can swipe the slide element to complete the authorization process or initiate an additional interaction guard corresponding to an additional authorization process based on the security level.

A step (325) may include waiting for the at least one authorization gesture based on a timer. The authorization gesture can be provided based on a released gesture or an absent of the gesture upon receiving the indication of the gesture. In some cases, the released gesture can indicate one or more instructions including at least a reset of the authorization process, initiation of a second interaction guard, the initiation of the authorization process corresponding to the security level, or the operation of the component 232 by the component controller 230 corresponding to the UI element 22. The timer can be provided or configured by the control unit 210. The timer can be initiated responsive to receiving the indication of the gesture or initiating the interaction guard. For example, a UI element 22 can be configured with a time-dependent interaction guard, as seen in FIG. 5A. The user can provide a gesture to the UI element 22 to initiate a timer. The completion of the timer can complete the authorization process corresponding to the time-dependent interaction guard. The termination of the timer can reset the authorization process. In another example, the UI element 22 can be configured with a multi-gesture interaction guard requiring a swipe gesture and a tap gesture, as seen in FIG. 5B. The user can swipe the slide element to initiate a timer. The termination of the timer, in this example, can correspond the completion of the authorization process based on providing a gesture prior to completing the timer. The completion of the timer can reset the authorization process, which can be moving the slide element back to a location prior to providing the swipe gesture.

A step (330) may include causing, by an automation controller 222 responsive to receiving the at least one authorization gesture, an operation of the component 232 corresponding to the identified at least one UI element 22. The operation of the component 232 can include a plurality of commands, wherein the automation controller 222 can select, responsive to the authorization gesture based on the interaction guard, the component 232 of the platform associated with the gesture for operation. The automation controller 222 can then provide the commands to the component controller 230 or directly to the components 232 to initiate the operation. The operation can include at least configuring one or more pumps, one or more valves, an engine of the platform, an altitude of the platform, the rate of changing the altitude, a pressure level of the platform, a temperature of the platform, a bleed air, or a plurality of components 232 configuration. The control unit 210 can be configured to output, for example, a second alert responsive to causing the operation of the component 232. The second alert can indicate at least the operation initiated, the status of the operation (e.g. initiated, in progress, or completed), or the overview of the result of the operation. The operation of the component 232 can be seen in at least FIG. 6, FIG. 7, FIG. 8A and FIG. 8B.

A step (335) may include initiating, by a report generator 224, a verification on the executed operation of the component 232 based on a verification process. The verification process can include at least testing the plurality of sensors 240 on the platform, initiating or activating the plurality of components 232, checking the status of each component 232, or generating an overview of the check, the overview can be similar to the second alert. The sensors 240 can be tested by a plurality of test instruments, such as a Digital Multimeter ("DMM"), a Power Supply, a Signal Generator, or at least a Network Analyzer. An indication of a non-functional sensor 240 can be based on at least an absent of a voltage going to the sensor 240, a high or low resistivity of the sensor 240, or an excessive current flow measured at one or more locations of the structure of the platform. The initiation or activation of the plurality of components 232 and checking the status of each component 232 can be seen in at least FIGS. 8A-B. For example, the control circuit 210 can command the valves to open. The sensor 240 can obtain at least one information of the status of the valve responsive to commanding the valve to open. The control circuit 210 can provide at least one indication or overview of the result based on the information obtained by the sensor 240.

In some cases, the verification can be executed concurrent to the operation of the component 232. For example, the user can configure the temperature of the platform by providing a gesture to the air conditioner ("A/C") element, as seen in FIGS. 5A-B, and FIG. 6. The control circuit 210 can increase or decrease the airflow of the A/C. The sensor 240 can verify, based on the temperature setting configured by the control circuit 210, at least a temperature output of the A/C or a temperature of the platform. The verification of the temperature output can indicate a correlation between the increase or decrease of the temperature setting and the A/C output. The control circuit 210 can provide an indication of an A/C failure based on at least an absent of temperature output change responsive to altering the temperature setting or the A/C providing an opposite operation.

A step (340) may include generating, by the report generator 224 responsive to the verification on the executed operation of the component 232, a verification report indicating one or more operations executed by the component 232. The report generator can be configured to display the verification report as a result message, as seen in FIG. 8B. The verification report can be configured as a plurality of log data, which can indicate a plurality of executions of the operation based on the component controller instruction and the result yield by the components based on the instruction. The verification report can be provided in a plurality of formats, such as a PDF file, an excel file, a text file, a word file, or html file. The report generator 224 can be configured, by the control unit 210, to include or exclude information corresponding to the verification process. The verification report can provide, based on an indicated error corresponding at least one component 232, one or more points of error associated with at least the component 232 or the structure of the platform (e.g. wires, filters, or other accessories for interaction with the component 232).

A step (345) may include storing, responsive to generating the verification report, the verification report in a memory and displaying, by the display device, the verification report indicating at least the status of the component 232 and an indication of execution status of the automation process. The verification report can be displayed in a pop-up window, similar to the report message, as seen in FIG. 8B. The verification report can be configured as a tabular or a graphical format. For example, the verification process can provide the plurality of information corresponding to the operation. The verification process can be a time-dependent, wherein the sensor 240 can continuously collect and store information corresponding to the verifying component 232. The information can be provided in an array indicating the time of collecting the data and a value based on the information. The array can be provided in a plurality of excel file cells (e.g. tabular format) and/or plotted in the graphical format to display a time versus value graph. The tabular or graphical representation of the information can be displayed on the display device 252 of the user interface 250.

In some cases, the control circuit 210 can be configured to not store the verification report. For example, the control circuit 210 can display the verification report generated by the system via the display device 252 and discarding the verification report responsive to terminating the display window. The display window can be terminated based on an indication of a gesture to a close element displayed in one or more locations of the verification report. The control circuit 210 can be further configured to not display the verification report and provide the data within least one file. The control circuit 210 can be additionally configured to not store or display the verification report. For example, the control circuit 210 can terminate the verification process prior to completing the verification, responsive to an indication of a gesture corresponding to a cancellation element, similar to FIGS. 4A-B, wherein the generation of the cancellation element can be during the initiated verification process. The control circuit 210 can provide a confirmation element based on providing the gesture to the cancellation element. The control circuit 210 can discard the information responsive to the termination confirmation corresponding one or more operation.

Referring generally to FIGS. 4A-B, an exemplary embodiment of a user interface 250 of the system 200 is illustrated. The user interface 250 can be configured to display the structure 406 of the platform using the display device 252, which can include a plurality of UI elements 22 to operate the components 232. The structure 406 can include at least one component 232 of the platform. The UI elements 22 of the user interface 250 can include a plurality of selection elements 402, home element 408, fuel dump element 412, reset element 414, or at least one vent element 410. The plurality of selection elements 402 can include one or more UI elements 22 corresponding to the at least one component 232 of the platform such as an add element 404 which can be selected to provide at least one additional UI element 22. The additional UI element 22 can correspond to at least one component 232 of the structure 406, which can be dynamically configured via the user interface 250. The selection element 402 can be selected by the user using at least one gesture or by the automation controller 222 executing an operation. The fuel dump element 412 can be used to initiate a fuel dump automation process. The reset element 414 can be configured to initiate an operation to set the components 232 to one or more preconfigured settings (e.g. default settings) using the component controller 230. The initiation of the operation can be indicated by changing at least the color-code or the animation of the structure 406 of the platform.

The user interface 250 can be preset or configured via the user input device 254 providing at least one command to the interface generator 226 of the control circuit 210. The user interface 250 can require an authorization (e.g. password, pattern, or other unlock features) prior to configuration by the user. In some cases, the user can decide to configure the user interface 250 visual appearance including at least color, shape, size, or location of the user interface. For example, the user can adjust a dialog box 416 to be circular and to appear on the bottom of the display device 252 in red. The user can further decide to configure at least one confirmation message of the dialog box 416. In some cases, the user can be blocked from accessing at least one user interface 250 configuration tools, such that the user interface 250 can remain as default.

Referring more specifically to FIG. 4A, an exemplary embodiment of a user interface 250 of the system 200 demonstrating a multi-location interaction guard using a fuel dump operation is illustrated. The tank element 410 can provide an indication of one or more statuses of the tank using at least one color-code. The status can include at least an initial vent element 410 status, a vent selection 422 status, or a vent execution 424 status. Vent selection 422 status can be indicated by color-coding one or more portions of the vent element 410, which can indicate the selection of the vent element 410 prior to execution of an operation. The vent execution 424 status can be indicated by at least one color-code of entire portions of the vent element 410, which can indicate the execution of the operation corresponding to the vent element 410.

In some embodiments, the user can initiate a fuel dump operation by providing a gesture indicating the fuel dump element 412 selection to initiate an interaction guard corresponding to the fuel dump operation, for example, the user can press on the fuel dump element 412 indicated by the user interface 250 to initiate an interaction guard corresponding to the fuel dump operation. The interaction guard corresponding to the fuel dump automation process can be configured to display a dialog box 416. The dialog box 416 can provide an indication of at least a cancellation element 418 or a confirmation element 420 in a completely different location from the fuel dump element 412. The cancellation element 418 can be configured to terminate the initiation of the operation corresponding to the selected UI element 22 on the user interface 250. The confirmation element 420 can be configured to initiate the operation corresponding to the selected UI element 22. The interaction guard can be further configured to display a guide for user to confirm the operation, for example, the dialog box 416 can provide a text guide (e.g. "confirm fuel dump") which can request a gesture from the user to confirm an initiation of the operation. The user can decide to provide a gesture to the cancellation element 418 to terminate the initiation of the fuel dump operation or provide a gesture to the confirmation element 420 to initiate the fuel dump operation. In some embodiments, the user can decide not to provide a gesture to the user input device 254. The interaction guard can determine, responsive to a countdown or a timer based on an absent of the gesture subsequent to generating the dialog box 416, to terminate the initiation of the operation.

Referring now to FIG. 4B, an exemplary embodiment of a user interface 250 of the system 200 demonstrating a multi-location interaction guard using an engine pump shutdown operation, similar to the one seen in FIG. 4A, is illustrated. The user interface 250 can display, via the display device 252, at least one engine pumps element 426 or the structure 406 of the platform, which can include the engine pumps 430. In some embodiments, the user can initiate the engine pumps 430 shutdown operation by providing a gesture to the engine pumps element 426, which can initiate an interaction guard corresponding to the engine pumps 430 shutdown operation. The interaction guard corresponding to the engine pumps 430 shutdown operation can be configured to display a dialog box 432, similar to the fuel dump dialog box 416, in a different location from the engine pumps element 426. For example, the dialog box 416 can be displayed relative from the selected UI element 22, such as at least a pixel away, on the edge of, or a preconfigured distance from the UI element 22. In another example, the dialog box 416 can be displayed relative to the user interface 250, such as a distance away from the edge or corner, between centroid pixels, or on a preconfigured location of the user interface 250. The dialog box 432 can provide an indication of cancellation element 418 and confirmation element 420. The user interface 250 can provide, based on initiating the engine pumps 430 shutdown operation, an indication of the engine pumps 430 shutdown using one or more color-code or animation. The user interface 250 can update at least the color-code or the animation of the engine pumps 430 to indicate the disabled engine pumps 430 using the interface generator 226, the disabled engine pumps 430 can be indicated by an absent of at least a color-code or animation. For example, an enabled engine pumps 430 can be displayed via the user interface 250, indicated by at least the color-code or wheel animation 428. The user can decide to shut down the engine pumps 430 by clicking on the engine pumps element 426, which can generate an interaction guard corresponding to the engine pumps 430 shutdown operation. The interaction guard can provide a dialog box 432 requesting confirmation corresponding to the operation, which the user can confirm the operation by clicking on the confirmation element 420. The user interface 250 can update, based on the initiated engine pumps 430 shutdown operation, the color-code of the engine pumps 430 and the engine pumps element 426, and disable the engine pumps 430 wheel animation 428. The absent of wheel animation 428 can indicate the disabled engine pumps 430.

Referring generally to FIGS. 5A-B, an exemplary embodiment of a user interface 250 demonstrating various types of interaction guard is illustrated. The user interface 250 can be configured to display a plurality of UI elements 22 including at least an electric element 510, an extension light element 515, an ice protection element 520, an emergency depressurize element 525, a controller mode element 530, pressurization element 535, bleed air element 540, and air conditioner ("A/C") element 545. The electric element 510 can be selected, by a gesture via the user input device 254, to generate electricity within the platform using one or more generators or alternators. The generated electricity can be distributed via various distribution buses to provide electricity to the components 232. The extension light element 515 can be selected to enable or disable a plurality of extension lights of the platform. The extension light can be a navigation light for providing an indication of at least the platform position, heading, or status. The ice protection element 520 can be selected to at least remove ice formed on the platform or prevent ice from forming on the platform. The ice protection element 520 can command a de-icing system or an anti-icing system of the platform to execute at least one ice prevention or ice removal technique.

The emergency depressurize element 525 can be displayed, via the display device 252, responsive to selecting the pressurization element 535. The emergency depressurize element 525 can be replaced with at least a bleed air control responsive to selecting the bleed air element 540 or at least an A/C control responsive to selecting the A/C element 545. The bleed air control can configure at least one amount of compressed air to provide to the components 232 of the platform. The A/C control can configure a temperature to provide the platform. For example, a gesture can be provided to set the bleed air percentage, via bleed air control, to 1% of the air passing through various compressors of the platform to be redirected to a pressurization component or at least an A/C component. The pressurization component can be configured to provide an appropriate oxygen level to the platform, and the A/C component can be configured, via A/C control, to provide the platform with a pre-determined temperature.

The controller mode element 530 can configure one or more the platform operations or one or more UI elements 22 to display. The controller mode element 530 receive at least a press gesture or a drag gesture to select between each controller mode. The controller mode can include a constant altitude mode, a manual mode, an automatic mode, a no pressurization mode, or an auxiliary vent mode. The constant altitude mode can command the platform to maintain a predetermined altitude level. The manual mode can, for example, block user input from various portions of the user interface 250 and provide an indication (e.g. dialog box or pop-up text) for the user to operate the platform manually. The various portions can exclude the controller mode element 530. The automatic mode can change the UI elements 22 to provide one or more operation element for a plurality of automation process. The automatic mode can enable the automation controller 222 to operate the components 232 via the component controller 230. The no pressurization mode can terminate air from being pumped into the platform, for example, when the platform is not elevated from the ground. The auxiliary vent mode can provide an indication to display at least the pressurization element 535 for pressure control, the bleed air element 540 for bleed air control, or the A/C element 545 for temperature control.

Referring more specifically to FIG. 5A, an exemplary embodiment of a user interface 250 demonstrating a time-dependent interaction guard is illustrated. The user interface 250 can be customizable, as referred to in FIGS. 4A-B. The demonstration of the time-dependent interaction guard can be seen in at least one sequential step of diagram 505 to diagram 550 further to diagram 555. In some cases, the sequential step can be reversed. The user interface 250 can display diagram 505 prior to providing at least one gesture to the user input device 254, diagram 505 including at least the emergency depressurize element 525. Diagram 505 can be configured to display at least a status (e.g. on, off, active, etc.) of the emergency depressurize element 525 by the interface generator 226 based on the platform operation prior to activation. At least one gesture can be provided to the emergency depressurize element 525 to select the time-dependent interaction guard which can subsequently initiate an authorization process corresponding to the time-dependent interaction guard. The authorization process can be completed via at least a holding gesture.

Diagram 550 can cause a blooming animation on the emergency depressurize element 525 responsive to receiving an indication of the gesture. The blooming animation can correspond to the time-dependent interaction guard, which can bloom from the center to the edge of the emergency depressurize element 525 based on a configured timer to complete the authorization process. The blooming animation can include at least one color different from the emergency depressurize element 525 color, as in diagram 505. In some cases, the gesture can be terminated prior to depleting the timer to not activate at least one operation corresponding to the emergency depressurize element 525. The termination of the gesture can cancel reset the blooming animation, for example, back to the element displayed in diagram 505.

Diagram 555 can configure the status of the emergency depressurize element 525 responsive to an activation of at least one component of the platform based on completing the authorization process. The emergency depressurize element 525 can maintain the color-code of the blooming animation color, which can indicate at least a completed authorization process or an activation of the element. In some cases, the element can be deactivated based on a similar interaction guard including similar authorization process. In some other cases, the element can be deactivated without an interaction guard based an indication of a low security level. The security level can be at least configured by the user or preconfigured by the control unit 210, which can be determined based on one or more operations corresponding to at least one element.

Referring now to FIG. 5B, a user interface 250 of the system 200 demonstrating a multi-gesture interaction guard is illustrated. Similar to FIG. 5A, the demonstration can be seen in at least one subsequent step from diagram 560 to diagram 570 then to diagram 575 or in reverse. The emergency depressurize slide element 565 can be configured with a multi-gesture interaction guard, which can change the element display to be a slider, for example. The slider can provide an indication of the direction to slide. The emergency depressurize slide element 565 can be preset to an inactive state with the slider residing to the left of the slide, as in diagram 560. The element can be configured or preset via the user interface 250 based on at least one type of interaction guard. In some cases, the multi-gesture interaction guard can include at least one authorization process requiring two or more gestures. The multi-gesture interaction guard can require at least one combination of at least a slide gesture, a tap gesture, or a hold gesture to complete the authorization process. The multi-gesture interaction guard can be configured to require two or more similar gestures, such that an absent of the first gesture can be required prior to a subsequent initiation of a second gesture.

Diagram 570 demonstrate the slider maintaining the inactive state upon receiving an indication of the first gesture. The first gesture including sliding the emergency depressurize slide element 565 to the right of the slider. The first gesture can be completed based on releasing the gesture indicated by an absent of gesture to the user interface 250. A timer can be initiated responsive to the completed first gesture. The authorization process can be reset based on depleting the timer corresponding to the interaction guard. The authorization process can require a second gesture responsive to the absent of the first gesture prior to depleting the timer. For example, a timer can be preset to 1000 milliseconds ("ms") before termination. The timer can be initiated based on completing the first gesture. A decision can be made to not provide the second gesture within the preset time of 1000 ms. The emergency depressurize slide element 656 can be reset back to the slider seen in diagram 560 based on the depleted timer.

Diagram 575 demonstrate an activation of the emergency depressurize slide element 565 based on the user interface 250 receiving an indication of the second gesture. The second gesture can be the tap gesture to complete the authorization process. At least one command can be provided to the component controller 230 to operate the components 232 responsive to completing the authorization process corresponding to the element. An indication of the activated state can be displayed on the element, which can include at least one color-code different from an inactive state color of the element or a text indicating the state of the element. The deactivation process can be similar to FIG. 5A.

Referring now to FIG. 6, an exemplary embodiment of a user interface 250 demonstrating a combined input methods is illustrated. The diagram can include one or more similar elements to FIGS. 5A-B. The user interface 250 can be configured to display at least one indication of the platform status 610, a scroll element 615, at least one fine tune element 650, or a manual control selectors 620. The platform status 610 can include at least an indication of cabin altitude level 645, a rate level 660 (e.g. rate of ascent or descent), pressure difference, or auto setting. The manual control selector 620 can include at least a valve element 625, rate element 630, or altitude element 635. The platform status 610 can be configured using a gesture on the scroll element 615 or the fine tune element 650. In some embodiments, the scroll element 615 and fine tune element 650 can correspond to the cabin altitude level 645, based on the altitude element 635 selection in the manual control selector 620.

The scroll element 615 and the fine tune element 650 can be executed individually or in combination. In some embodiments, the user can configure the platform status 610 using the scroll element 615 by initiating a gesture including at least a hold and drag gesture on the scroll element 615. For example, the user can hold and drag up a first scroll element 615 from diagram 605 to a desired altitude level indicated by a second scroll element 615 from diagram 640.

The cabin altitude level 645 of the platform status 610 from diagram 605 can be updated to a second cabin altitude level 645 from diagram 640 responsive to the provided gesture.

In some embodiments, the user can decide to configure the platform status 610 using the fine tune element 650. The fine tune element 650 can update the scroll element 615 based on the configured platform status 610. For example, the user can tap on the fine tune element 650 to initiate a step adjustment of the cabin altitude level 645. The step adjustment can include an increase or decrease of the platform status 610 by a pre-determined level, for example, the cabin altitude level 645 can be increased or decreased by 25 feet for each tap on the fine tune element 650. The user can decide to provide a hold gesture to the fine tune element 650 for repeated a plurality of steps to configure the platform status 610 based on the duration of the hold. The user can configure, via the user interface 250, the stepping frequency and range of the fine tune element 650, for example, configure from an increment of 25 feet per step to 10 feet per step or from 100 ms per step to 50 ms per step for higher frequency when holding the fine tune element 650.

In some embodiments, the user can configure the rate level 660 of the platform status 610 by selecting the rate element 630 in the manual control selector 620. The interface generator 226 can generate the scroll element 615 display based on the rate level 660 responsive to the selection of the rate element 630. The scroll element 615 and the fine tune element 650 corresponding to the rate element 630 selection can function similar to the scroll element 615 and the fine tune element 650 corresponding to the altitude element 635 selection. The user can decide to use at least the scroll element 615, the fine tune element 650, or a combination of elements to configure the rate level 660. The rate level can be configured responsive to providing at least one gesture to the element. In some cases, a plurality of settings for the scroll element 620 and the fine tune element 650 corresponding to the rate element 630 selection can be independent from the altitude element 635 or the valve element 625 selection.

Figure 7:
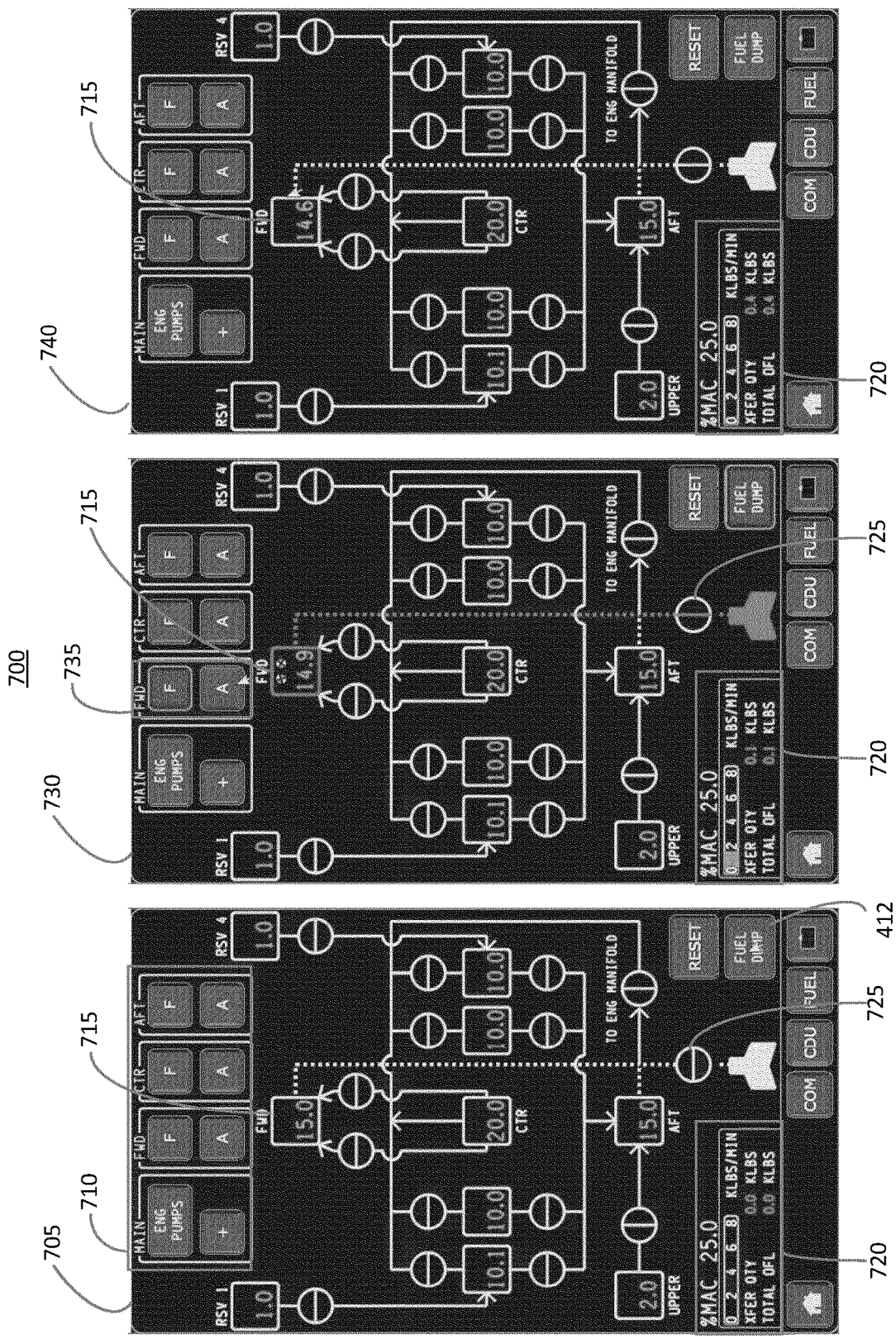
FIG. 7 is a schematic diagram of an exemplary embodiment of a user interface for demonstrating a fuel dump operation according to the inventive concepts disclosed herein.

Referring now to FIG. 7, an exemplary embodiment of a user interface 250 demonstrating a fuel dump operation is illustrated. The user interface 250 can include similar structure or a plurality of elements similar to FIGS. 4A-B. The user interface 250 can include at least a fuel dump status 720, a valve 725, a fuel tank 715, and a plurality of selection elements 710 similar to the selection elements 402 from FIGS. 4A-B. The selection elements 710 can include one or more pump elements 735 such as a fuel pump or an auxiliary pump. The pump elements 735 can operate responsive to receiving an indication of at least one gesture via the user input device 254 on at least one pump indication. The fuel dump status 720 can include at least a dumping rate (e.g. kilo pounds per minute, gallon per minute, etc.), a transfer quantity, or a total fluid ounce. The dumping rate can be represented by a bar, with the rate indicated by filling up the bar with at least one color-code.

Diagram 705 can display the structure of the platform without operation. The valve 725 can initially be in a closed state as indicated with a horizontal line in the valve 725. The user interface 250 can receive a gesture on the fuel dump element 412 to select an interaction guard to execute an authorization process, as referred to in FIG. 4A. Diagram 730 can display the valve 725 in an opened state responsive to completing the authorization process, the opened state can be indicated by a color-coded vertical line in the valve 725. The fuel tank 715 can be color-coded responsive to completing the authorization process, which can indicate the fuel tank 715 selection as part of the component controller 230 operation. The fuel tank 715 can include at least an indication of a fuel level or one or more pixie wheels based on the selection of the pump elements 735. For example, the pixie wheels in the fuel tank 715 can be displayed based on selecting or activating the fuel pump and the auxiliary pump, the selection or activation of the pumps can be color-coded within the pump element 735. The selection of the pump elements 735 can initiate the fuel dump operation, as referred to in diagram 730.

The fuel dump status 720 and the fuel tank 715 can be updated responsive to one or more sensors 240 indicating at least the rate of the fuel dump and the available fuel in the fuel tank 715. The fuel dump rate can be based on at least the valve 725 size or the pump suction and discharge rate. The fuel dump operation can be terminated based on at least one gesture to the fuel dump element 412, which can disable the pump elements 735. The user interface 250 can be configured to display a default color-coded platform structure based on the termination of at least one operation, as referred to in diagram 740. For example, the fuel dump operation can be initiated on the fuel tank 715 containing 15-kilo pounds of fuel. The user can decide to terminate the fuel dump operation by taping on the fuel dump element 412 to at least stop the pumps of the fuel tank 715 or close the valve 725 subsequent to dumping 0.4-kilo pounds of fuel. The fuel tank 715 can display the available fuel in the tank based on at least the sensor 240 indicating the available fuel or at least the difference between the initial available fuel and the quantity of fuel dumped indicated by the fuel dump status 720. In some cases, the user can decide to pause the fuel dump operation based on disabling the pump elements 735 without disabling the fuel dump element 412.

Referring generally to FIG. 8A-B, an exemplary embodiment of a user interface 250 demonstrating a fuel pressure check operation is illustrated. The user interface 250 can be configured to display a plurality of UI elements 22 and structure of the platform, similar to FIGS. 4A-B. The user interface 250 can include a plurality of selection elements 810 with configured format, but similar functionality to the selection elements 402 from FIGS. 4A-B, a start element 815, one or more engine pumps 430, and one or more valves 830 corresponding to the engine pumps 430. The selection elements 810 can be configured via the user input device 254 in communication with the interface generator 226. The start element 815 can initiate at least one operation of the automation controller 222 stored in memory 220. In some cases, the start element 815 can correspond to a fuel pressure check operation.

Referring more specifically to FIG. 8A, an exemplary embodiment of a user interface 250 demonstrating an initiation of a fuel pressure check operation is illustrated. The user can decide to initiate the fuel pressure check operation by providing an indication of a gesture to the start element 815. The start element 815 can be color-coded responsive to the gesture, which can indicate an acknowledgement of receiving the gesture. The control circuit 210 can provide one or more commands to the component controller 230 to initiate the fuel pressure check operation responsive to receiving the indication of the gesture on the location of the user interface 250 corresponding to the start element 815. The interface generator 226 can generate an initiation message 825 responsive to providing the commands to the components 232. The plurality of engine pumps 430 can be provided with at least one color-code to indicate the selection of the engine pumps 430 as a portion of the operation, as seen in diagram 820. The valves 830 corresponding to the engine pumps 430 can be configured to an opened state responsive to the initiation of the fuel pressure check operation based on the automation controller 222. In some cases, the fuel pressure check operation can be terminated, based on at least one status of the platform. The status of the platform can include a state of the valve 830, a condition of one or more sensors 240, or a conflicting operation of one or more components 232 of the platform. The user interface 250 can be configured by the control circuit 210 to display at least an error message corresponding to the termination, the error message can indicate one or more points of failure. The user interface 250 can be further configured to provide a dialog box to confirm at least operation to provide to the components 232, the operation to resolve at least one corresponding failure.

Referring now to FIG. 8B, an exemplary embodiment of a user interface 250 demonstrating an execution or completion of a fuel pressure check operation is illustrated. The execution of the fuel pressure check operation can be indicated by an execution message 840 seen in Diagram 835 similar to the initiation message 825 or the completion message 860. The path 845 leading to the engine pumps 430 can be color-coded to indicate which of the engine pump 430 the operation is checking, the check at be executed by running the engine pump 430 indicated by generating at least one pixie wheel 428 corresponding to the pump. The fuel pressure check operation can be done sequentially to each engine pumps 430, indicated by a sequential generation of the pixie wheel 428.

Diagram 855 provide an indication of a completed fuel pressure check operation indicated by the completion message 860. The control unit 210 can collect and provide one or more results responsive to completing the fuel pressure check operation. The results can be displayed as a result message 870, as seen in diagram 865. A result element 875 can be provided instead of the start element 815 based on a completed status of the fuel pressure check operation. In some cases, the result message 870 can be an overview result, which can indicate a failure corresponding to at least one engine pump 430. The failure can be indicated by a marker (e.g. cross, slash, etc.) at a location corresponding to the failed pump. The result element 875 can be color-coded to indicate the result message 870 containing at least one failure. In some cases, the result can indicate an absent of failure, which can be indicated by at least an absent of the marker or the color-code on the result element 875 corresponding to the absent of failure. The user can provide a gesture to the result element 875 to generate at least one report by the report generator 224 based on the fuel pressure check operation. The report can be in various format, such as a PDF file, an excel file, a text file, a word file, or html file. The report can provide at least an indication of failure, the status of the components 232, or an execution time of the operation.

As will be appreciated from the above, systems and methods for automating components with guarded touch-screen controls according to embodiments of the inventive concepts disclosed herein may improve the operation of aircraft and other platforms by providing visual representation of various components and structures of the platform, various UI elements to initiate an operation, various interaction guards corresponding to the UI elements for preventing accidental interaction, as well as generating a report based on an executed operation. The visual representation can be color-coded to help users indicate a status or a process of the operation. For example, the status can identify at least a state of the operation, e.g. initiation, execution, or completion state, or the time to completion, e.g. 5 minutes, 30 minutes and 20 seconds, etc., whereas the process can help the user identify an operating component. The UI elements can correspond to an operation for configuring the various components of the platform. The UI elements can initiate the operation based on an indication of a gesture, wherein the operation can include a plurality of instructions for configuring the components. Initiating a plurality of instruction based on a single gesture can reduce time and increase efficiency for the user to configure the component of the platform. The operation can be executed continuously, sequentially, or periodically based on the control circuit configuration. In some cases, the interaction guard can be selected based on the UI element to help avoid accidental, unintentional, or unauthorized interaction. The interaction guard can be multi-layered or multi-gestured based on the severity of the configuration to the operation of the platform. The generated report can provide a visual feedback of changes to the platform based on the operation, which can allow the user to further fine-tune or adjust the configuration prior to terminating the operation. The system can improve upon existing analog controls by automatically configuring a plurality of components via selecting a UI element (rather than configuring a plurality of analog controls to execute a single operation).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display device; and
a control circuit configured to:
generate an interface comprising a visual representation of a component of a platform, a status of the component indicated by a plurality of sensors associated with the platform, and one or more user interface elements corresponding to the component of the platform and one or more locations on the interface;
receive an indication of one or more gestures via the interface, the gesture identifying at least one user interface element;
identify a security level associated with the identified interface element based on a severity of the operation a current operational phase;
select, based on the gesture, an interaction guard from a plurality of interaction guards, each interaction guard corresponding to a respective authorization process identifying at least one authorization gesture;
selecting a second interaction guard, distinct from the interaction guard, from the plurality of interaction guards if the security level is above a predefined threshold;
initiate, responsive to the selected interaction guard or second interaction guard, the authorization process corresponding to the interaction guard, wherein the initiation of the interaction guard concurrently initiates an animation corresponding to the authorization process; and
cause, by an automation controller responsive to receiving the at least one authorization gesture, an operation of the component corresponding to the identified at least one user interface element.

2. The system of claim 1, wherein the control circuit is configured to:
initiate, by a report generator, a verification on the initiated operation of the component based on a verification process;
generate, by the report generator responsive to the verification on the executed operation of the component, a verification report indicating one or more operations executed by the component;
store, responsive to generating the verification report, the verification report in a memory; and
display, by the display device, the verification report indicating at least the status of the component and an indication of execution status of the automation process.

3. The system of claim 1, wherein the control circuit is configured to output a first alert responsive to initiating the authorization process corresponding to the interaction guard and output a second alert responsive to causing the operation of the component.

4. The system of claim 1, wherein the control circuit is configured to cause the display device to display the visual representation of the status of the platform, responsive to the plurality of sensors transmitting one or more information to the interface generator, the information corresponding to one or more inputs received by the sensor.

5. The system of claim 1, wherein the control circuit is configured to:
determine, responsive to receiving the indication of the gesture, a release of the gesture based on the absence of the gesture corresponding to a released location; and
determine, based on the released location of the gesture, the user interface element configuration corresponding to the operation of the component.

6. The system of claim 5, wherein the released gesture indicates one or more instructions comprising at least a reset of the authorization process, initiation of a second interaction guard, the initiation of the authorization process corresponding to a security level, or the operation of the component by a component controller corresponding to the user interface element.

7. The system of claim 1, wherein the automation controller selects, responsive to the authorization gesture based on the interaction guard, the component of the platform associated with the gesture for operation.

8. The system of claim 1, wherein the control unit causes a visual representation of the animation to be displayed via the display device.

9. An airborne platform comprising:
a plurality of sensors to detect one or more component statuses;
a centralized automated controller configured to store one or more operation instructions to operate the component of the airborne platform;
a communication interface configured to retrieve, via a network, the one or more operation from a centralized repository for the automation controller;
a display device; and
a control circuit configured to:
generate an interface comprising a visual representation of a component of a platform, a status of the component indicated by a plurality of sensors associated with the platform, and one or more user interface elements corresponding to the component of the platform and one or more locations on the interface;
receive an indication of one or more gestures via the interface, the gesture identifying at least one user interface element;
identify a security level associated with the identified interface element based on a severity of the operation a current operational phase;
select, based on the gesture, an interaction guard from a plurality of interaction guards, each interaction guard corresponding to a respective authorization process identifying at least one authorization gesture;
select a second interaction guard, distinct from the interaction guard, from the plurality of interaction guards if the security level is above a predefined threshold;
initiate, responsive to the selected interaction guard or second interaction guard, the authorization process corresponding to the interaction guard, wherein the initiation of the interaction guard concurrently initiates an animation corresponding to the authorization process; and
cause, by an automation controller responsive to receiving the at least one authorization gesture, an operation of the component corresponding to the identified at least one user interface element.

10. The airborne platform of claim 9, wherein the control circuit is configured to:
initiate, by a report generator, a verification on the initiated operation of the component based on a verification process;
generate, by the report generator responsive to the verification on the executed operation of the component, a verification report indicating one or more operations executed by the component;
store, responsive to generating the verification report, the verification report in a memory; and
display, by the display device, the verification report indicating at least the status of the component and an indication of execution status of the automation process.

11. The airborne platform of claim 9, wherein the control circuit is configured to output a first alert responsive to initiating the authorization process corresponding to the interaction guard and output a second alert responsive to causing the operation of the component.

12. The airborne platform of claim 9, wherein the control circuit is configured to cause the display device to display the visual representation of the status of the platform, responsive to the plurality of sensors transmitting one or more information to the interface generator, the information corresponding to one or more inputs received by the sensor.

13. The airborne platform of claim 9, wherein the control circuit is configured to:
determine, responsive to receiving the indication of the gesture, a release of the gesture based on the absent of the gesture corresponding to a released location; and
determine, based on the released location of the gesture, the user interface element configuration corresponding to the operation of the component.

14. The airborne platform of claim 13, wherein the released gesture indicates one or more instructions comprising at least a reset of the authorization process, initiation of a second interaction guard, the initiation of the authorization process corresponding to a security level, or the operation of the component by a component controller corresponding to the user interface element.

15. The airborne platform of claim 9, wherein the automation controller selects, responsive to the authorization gesture based on the interaction guard, the component of the platform associated with the gesture for operation.

16. The airborne platform of claim 9, wherein the control unit causes a visual representation of the animation to be displayed via the display device.

17. A method, comprising:
generating, at a control unit, an interface comprising a visual representation of a component of a platform, a status of the component indicated by a plurality of sensors associated with the platform, and one or more user interface elements corresponding to the component of the platform and one or more locations on the interface;
receiving, at the interface, an indication of one or more gestures, the gesture identifying at least one user interface element;
identifying a security level associated with the identified interface element based on a severity of the operation a current operational phase;
selecting, based on the gesture, an interaction guard from a plurality of interaction guards, each interaction guard corresponding to a respective authorization process identifying at least one authorization gesture;
selecting a second interaction guard, distinct from the interaction guard, from the plurality of interaction guards if the security level is above a predefined threshold;
initiating, responsive to the selected interaction guard or second interaction guard, the authorization process corresponding to the interaction guard, wherein the initiation of the interaction guard concurrently initiates an animation corresponding to the authorization process; and
causing, by an automation controller responsive to receiving the at least one authorization gesture, an operation of the component corresponding to the identified at least one user interface element.

18. The method of claim 17, further comprising:
initiating, by a report generator, a verification on the initiated operation of the component based on a verification process;
generating, by the report generator responsive to the verification on the executed operation of the component, a verification report indicating one or more operations executed by the component;
storing, responsive to generating the verification report, the verification report in a memory; and displaying, by the display device, the verification report indicating at least the status of the component and an indication of execution status of the automation process.

19. The method of claim 17, further comprising:

determining, by the control circuit responsive to receiving the indication of the gesture, a release of the gesture based on the absent of the gesture corresponding to a released location; and determine, by the control circuit based on the released location of the gesture, the user interface element configuration corresponding to the operation of the component.

20. The method of claim 17, further comprising:

displaying, by the display device responsive to initiating the animation, a visual representation of the animation.

* * * * *